(12) United States Patent
Wang et al.

(10) Patent No.: US 12,082,006 B2
(45) Date of Patent: Sep. 3, 2024

(54) METHOD AND DEVICE FOR O-RAN-BASED PERFORMANCE OPTIMIZATION AND CONFIGURATION

(71) Applicant: Samsung Electronics Co., Ltd., Suwon-si (KR)

(72) Inventors: Zhigang Wang, Beijing (CN); Qixin Huang, Beijing (CN); Ranran Zhang, Beijing (CN); Ying Zhu, Beijing (CN); Ying Wang, Beijing (CN); Yan Li, Beijing (CN); Ying Li, Beijing (CN); Honghong Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 17/561,306

(22) Filed: Dec. 23, 2021

(65) Prior Publication Data

US 2022/0116799 A1  Apr. 14, 2022

Related U.S. Application Data

(63) Continuation of application No. PCT/KR2021/003247, filed on Mar. 16, 2021.

(30) Foreign Application Priority Data

Mar. 20, 2020 (CN) .......................... 202010201781.6

(51) Int. Cl.
*H04W 24/02* (2009.01)
*H04B 7/0413* (2017.01)
(Continued)

(52) U.S. Cl.
CPC .......... *H04W 24/02* (2013.01); *H04B 7/0413* (2013.01); *H04L 41/0823* (2013.01);
(Continued)

(58) Field of Classification Search
CPC ..... H04W 24/02; H04W 28/16; H04W 48/18; H04L 41/0823; H04L 41/16; H04B 7/0413
(Continued)

(56) References Cited

U.S. PATENT DOCUMENTS 9,379,794 B2  6/2016 Du et al.
10,057,777 B2  8/2018 Li et al.
(Continued)

FOREIGN PATENT DOCUMENTS

| CN | 108770014 A | 11/2018 |
|---|---|---|
| KR | 10-1731479 B1 | 4/2017 |
| WO | 2017/078770 A1 | 5/2017 |

OTHER PUBLICATIONS

O-RAN Alliance, "O-RAN: Towards an Open and Smart RAN", Oct. 2018, 20 pages.
(Continued)

*Primary Examiner* — Ted M Wang

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Specifically, the present disclosure relates to an O-RAN based network system.

15 Claims, 12 Drawing Sheets

(51) Int. Cl.
  *H04L 41/0823* (2022.01)
  *H04L 41/16* (2022.01)
  *H04W 28/16* (2009.01)
  *H04W 48/18* (2009.01)

(52) U.S. Cl.
  CPC ............. *H04L 41/16* (2013.01); *H04W 28/16* (2013.01); *H04W 48/18* (2013.01)

(58) Field of Classification Search
  USPC .......................................................... 455/414
  See application file for complete search history.

(56) References Cited

U.S. PATENT DOCUMENTS

| | | | |
|---|---|---|---|
| 10,110,671 B2 | 10/2018 | Ganguli et al. | |
| 2007/0223423 A1 | 9/2007 | Kim et al. | |
| 2011/0009105 A1 | 1/2011 | Lee et al. | |
| 2013/0097269 A1* | 4/2013 | Plotkin | H04M 1/7243 709/206 |
| 2016/0142123 A1* | 5/2016 | Zhang | H04B 7/0647 375/267 |
| 2021/0029580 A1* | 1/2021 | Gupta | H04W 24/08 |

OTHER PUBLICATIONS

O-RAN Alliance, "O-Ran WG1, Use Cases Detailed Specification v02.00", O-RAN-WG1. Use Cases Detailed Specification v02.00. 10, Apr. 2020, 55 pages.

O-RAN Alliance, "O-RAN Operations and Maintenance Interface Specification V02.00", O-RAN-WG1.O1-Interface-v02.00, Dec. 2019, 47 pages.

O-RAN Alliance, "O-RAN Working Group 3 Near-Real-time RAN Intelligent Controller E2 Service Model (E2SM)", ORAN-WG3. E2SM-V00.01.01, Jan. 20, 2020, 24 pages.

"3rd Generation Partnership Project; Technical Specification Group Core Network and Terminals; Numbering, addressing and identification; (Release 17)", 3GPP TS 23.003 V17.4.0, Dec. 16, 2021, 146 pages.

International Search Report dated Jun. 23, 2021 in connection with International Patent Application No. PCT/KR2021/003247, 4 pages.

Written Opinion of the International Searching Authority dated Jun. 23, 2021 in connection with International Patent Application No. PCT/KR2021/003247, 3 pages.

Supplementary European Search Report dated Jun. 27, 2023, in connection with European Patent Application No. 21771865.9, 12 pages.

* cited by examiner

METHOD AND DEVICE FOR O-RAN-BASED PERFORMANCE OPTIMIZATION AND CONFIGURATION

CROSS-REFERENCE TO RELATED APPLICATIONS

This application is a continuation of International Application No. PCT/KR2021/003247 filed on Mar. 16, 2021, which claims priority to Chinese Patent Application No. 202010201781.6 filed on Mar. 20, 2020, the disclosures of which are herein incorporated by reference in their entirety.

BACKGROUND

1. Field

The present disclosure relates to an O-RAN (Open Radio Access Network) network system, and more specifically, to a method and a device for performance optimization in an O-RAN system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, analog beam forming, and large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and Big Data processing technology through connection with a cloud server, has emerged. As technology elements, such as "sensing technology," "communication and network infrastructure," and "interface technology" have been demanded for IoT implementation, a sensor network, Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances, and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The revolution of 5G (5th-Generation, 5th generation mobile communication) core networks have quietly occurred. But in the field of radio access networks, 5G radio access networks have the characteristics of many kinds of traffic, large bandwidth and high frequency band, and the like, which will inevitably lead to smaller single station coverage, increased device complexity, and increased network scale, resulting in huge network cost and increased risk of investment return. Combined with these specific characteristics and requirements of radio networks, it is necessary to introduce new development and design idea of IT (Information Technology), CT (Communication Technology), and DT (Data Technology) integration in the field of the radio access networks, which is in line with macro evolution trends of the communication industry.

Based on the above information, China Mobile, which is together with AT&T and other operators and integrates the C-RAN Alliance and xRAN Forum, leads the establishment of the O-RAN (open radio access network) industry alliance, and provides two core visions of "openness" and "intelligence". This is in line with development trends of the communication industry and is another major network revolution led by operators. It is hoped that big data, machine learning, and artificial intelligence technologies will be used to build an open and intelligent radio network, and open standards, white box hardware, and open source software combined to reduce costs of the radio networks.

Aspects of the present disclosure address at least the above problems and/or disadvantages and provide at least the following advantages. This disclosure relates to an O-RAN-based network system.

SUMMARY

According to an aspect of the present disclosure, a method performed by a radio access network (RAN) intelligent controller (RIC) entity in a wireless communication system comprises: obtaining first information associated with a communication capability from a base station; obtaining second information associated with a terminal status from an application server; determining, based on the first information and the second information, at least one first terminal from a plurality of terminals for a first group and at least one second terminal from the plurality of terminals for a second group; transmitting a result of the determination to the base station, wherein the first group is associated with a single user multiple input multiple output (SU-MIMO) transmission and the second group is associated with a multi-user multiple input multiple output (MU-MIMO) transmission.

According to an aspect of the present disclosure, the first information includes at least one of configuration information, a performance indicator, or a measurement report, and the second information includes at least one of mobility information or traffic information, the mobility information comprising global positioning system (GPS) information. Further, an artificial intelligence/machine learning (AI/ML) module is used for the determination based on the second information, the RIC entity is a non-real-time (non-RT) RIC entity, and the result of the determination is transmitted via a near-RT RIC entity.

According to an aspect of the disclosure, the determining comprises: estimating at least one of a mobility or a traffic usage of each of the plurality of terminals based on the second information using the AI/ML module; and allocating, based on the estimation, the at least one first terminal for a first sub-slice instance corresponding to the first group and the at least one second terminal for a second sub-slice instance corresponding to the second group.

According to an aspect of the present disclosure, the method further comprises: determining a radio resource control (RRC) configuration for each of the at least one first terminal and the at least one second terminal; and transmitting the determined RRC configuration to the base station.

According to an aspect of the present disclosure, a radio access network (RAN) intelligent controller (RIC) entity in a wireless communication system comprises: a transceiver configured to transmit and receive a signal; and a controller coupled with the transceiver and configured to obtain first information associated with a communication capability from a base station, obtain second information associated with a terminal status from an application server, determine, based on the first information and the second information, at least one first terminal from a plurality of terminals for a first group and at least one second terminal from the plurality of terminals for a second group, and transmit a result of the determination to the base station, wherein the first group is associated with a single user multiple input multiple output (SU-MIMO) transmission and the second group is associated with a multi-user multiple input multiple output (MU-MIMO) transmission.

According to an aspect of the present disclosure, a method performed by a base station in a wireless communication system comprises: transmitting first information associated with a communication capability to a radio access network (RAN) intelligent controller (RIC) entity; receiving terminal grouping information from the RIC entity, and scheduling resources for terminals based on the terminal grouping information, wherein the terminal grouping information includes a first group comprising at least one first terminal and a second group comprising at least one second terminal, wherein the terminal grouping information is generated based on the first information and second information associated with a terminal status obtained from an application server, and wherein the first group is associated with a single user multiple input multiple output (SU-MIMO) transmission and the second group is associated with a multi-user multiple input multiple output (MU-MIMO) transmission.

According to an aspect of the present disclosure, a base station in a wireless communication system comprises: a transceiver configured to transmit and receive a signal; and a controller coupled with the transceiver and configured to transmit first information associated with a communication capability to a radio access network (RAN) intelligent controller (MC) entity, receive terminal grouping information from the RIC entity, and schedule resources for terminals based on the terminal grouping information, wherein the terminal grouping information includes a first group comprising at least one first terminal and a second group comprising at least one second terminal, wherein the terminal grouping information is generated based on the first information and second information associated with a terminal status obtained from an application server, and wherein the first group is associated with a single user multiple input multiple output (SU-MIMO) transmission and the second group is associated with a multi-user multiple input multiple output (MU-MIMO) transmission.

According to an aspect of the present disclosure, a device for performance optimization in an O-RAN system comprises a memory and a processor, wherein the memory has stored thereon instructions which, when executed by the processor, implement the aforementioned methods.

By measuring and predicting network load, user traffic volume, traffic type, mobility, etc., different transmission methods are selected for users in different scenarios, which are implemented by a slice policy, RRC configuration, or MAC scheduling policy, etc., so as to achieve improvement of performance aspects of improving throughput of base station systems, improving user experience, and helping a terminal save power, etc.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present disclosure will become more apparent from the following description of embodiments of the present disclosure with reference to accompanying drawings, in which.

DETAILED DESCRIPTION

Embodiments of the present disclosure are described below with reference to the accompanying drawings. However, it should be understood that these descriptions are exemplary only and are not intended to limit the scope of the disclosure. Furthermore, in the following description, descriptions of well-known structures and technologies are omitted to avoid unnecessarily obscuring concepts of the present disclosure. Although certain embodiments and examples have been provided, based on the disclosure herein, it will be apparent to those skilled in the art that changes may be made to the illustrated embodiments and examples without departing from the scope of the disclosure. Those skilled in the art will understand that principles of the present disclosure may be implemented in any suitably arranged system or device.

It can be understood by those skilled in the art that unless otherwise defined, all terms (including technical terms and scientific terms) used herein have the same meanings as those generally understood by those skilled in the art to which this disclosure belongs. It should also be understood that terms such as those defined in a general dictionary should be understood to have meanings consistent with those in the context of the prior art, and will not be interpreted in idealized or overly formal meanings unless specifically defined as such here.

Those terms used in the following description for identifying an access node, indicating a network entity or network function (NF), indicating messages, indicating an interface between network entities, and indicating various identification information are taken as illustration for ease of description. Accordingly, the disclosure is not limited by the terms to be described later, and other terms referring to objects having an equivalent technical meaning may be used.

With the development of various information technology (IT) technologies, network equipment has evolved into a virtualized network function (NF, which hereinafter may be used interchangeably with a 'network element') by applying virtualization technology, and virtualized NFs may be implemented in a software form without physical limitations to be installed/operated in various types of clouds or data centers (DCs). In particular, the NF may be freely expanded, scaled, initiated, or terminated according to service requirements, a system capacity, or a network load. It should be noted that even if these NFs are implemented in a software form, the NFs do not exclude physical configurations, because the NFs should be basically driven on a physical configuration, for example, a fixed equipment. Further, NFs may be implemented only with a simple physical configuration, that is, hardware.

Figure 1:
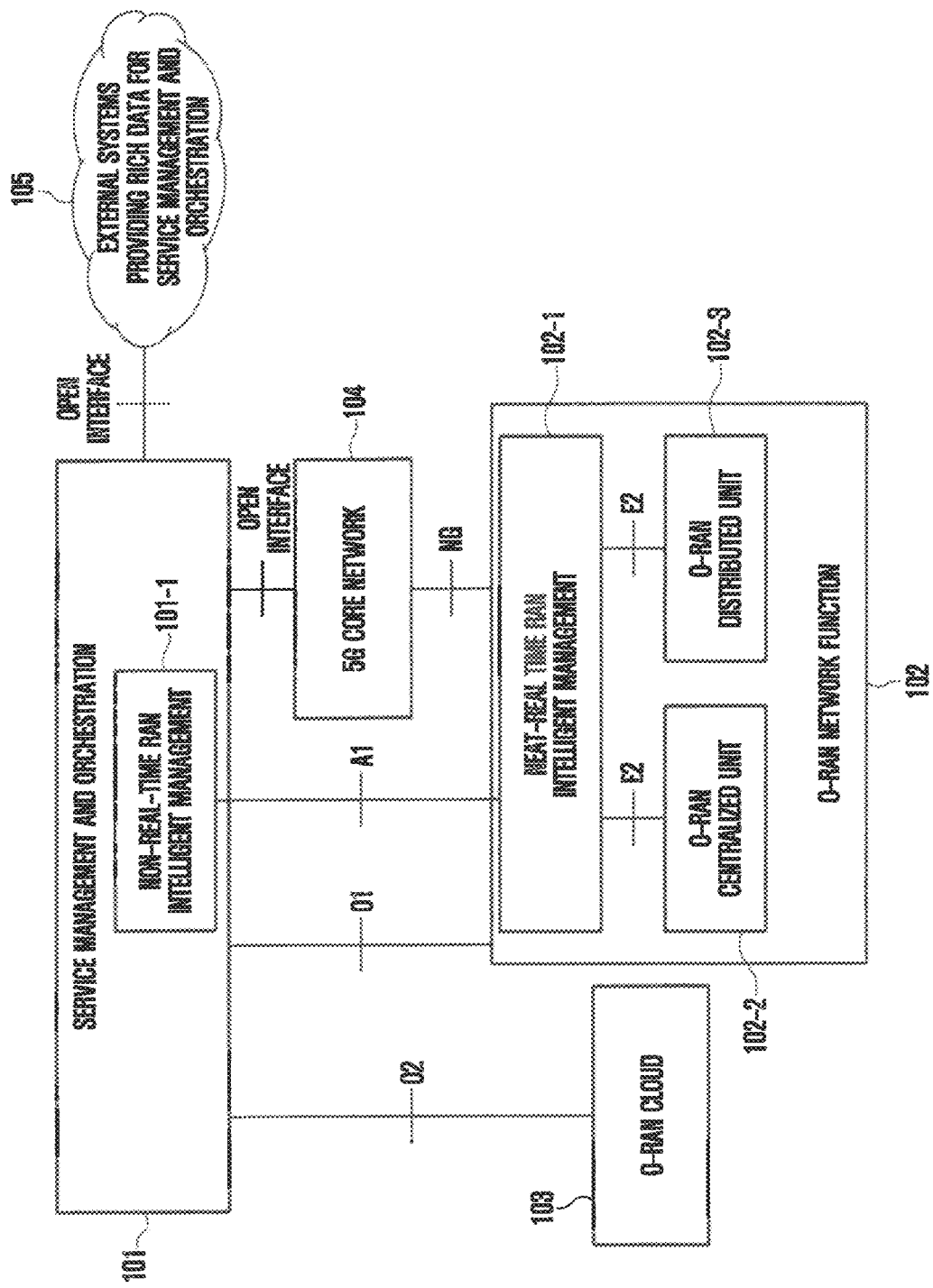
FIG. 1 illustrates an overall framework of an O-RAN (Open Radio Access Network) according to an embodiment of the present disclosure.

FIG. 1 illustrates an overall framework of an O-RAN (Open Radio Access Network) according to an embodiment of the present disclosure. The design principle of O-RAN reference architecture introduces open interface and open hardware reference design and uses artificial intelligence to optimize radio control flows at the same time, which is based on CU/DU (Centralized Unit/Distributed Unit) architecture and functional virtualization of radio networks. The description will be made below with reference to FIG. 1.

101 indicates service management and orchestration (SMO), which is an entity that provides various management services and network management functions.

101-1 indicates a Non-Real Time RAN Intelligent Controller (Non-RT RIC), which has functions of microservice and policy management, radio network analysis and training of artificial intelligence (AI) model, etc. The trained AI model is sent to a Near-Real Time RAN Intelligent Controller (Near-RT RIC) through an A1 interface for online predicting and execution.

102 indicates an O-RAN network function, which, as compared with a non-O-RAN system, has introduced a Near-Real Time RAN Intelligent Controller (Near-RT RIC), including entities such as O-RAN centralized unit (O-CU), an O-RAN distributed unit (O-DU), an O-RAN Radio Unit, (O-RU), etc.

The network function part 102 of the O-RAN can be a base station, and may be a Next Generation Node B (gNB) supporting a 5G protocol or an Evolved Node B (eNB) supporting a 4G (4th-Generation) LTE (Long Term Evolution) protocol.

A significant difference between the 5G protocol and the 4G protocol is that the 5G protocol supports network slices, while the 4G protocol does not have a concept of the network slices. Therefore, the gNB may generally support functions of the network slices, while the existing eNB does not have the functions of the network slices.

102-1 indicates a Near-RT RIC. A Near-Real Time RAN Intelligent Controller component in the O-RAN architecture is embedded in a CU for execution, which can be understood as an enhanced function entity of next generation Radio Resource Management (RRM) embedded with an artificial intelligence technology.

102-2 indicates an O-CU, which additionally supports an E2 interface as compared with a CU of the non-O-RAN system.

102-3 indicates an O-DU, which additionally supports an E2 interface as compared with a DU of the non-O-RAN system.

103 indicates an O-Cloud (O-RAN Cloud), which supports a cloud system with arrangeable tasks.

104 indicates a NG-core, which is a 5G core network.

105 indicates external systems, such as servers of various applications (APPs), e.g., application servers or external servers, which may provide rich data for the SMO 101.

An O1 interface is used to connect the SMO 101 and O-RAN network function 102 entities.

An O2 interface is used to connect the SMO 101 and the O-RAN Cloud (O-Cloud) 103.

An A1 interface is used to connect the non-real-time RAN Intelligent Controller 101-1 embedded in the network management function (e.g., the SMO 101), and the near-RT RIC 102-1 embedded in the eNB/gNB (e.g., the O-RAN network function 102) of a radio network element. With the introduction of artificial intelligence, the management interface A1 between the network management and the radio network elements exceeds functions of Fault, Configuration, Accounting, Performance and Security (FCAPS) of traditional network management, and expands new data information such as sending operation policies to base station and sending AI machine learning models, etc.

An E2 interface is a standard interface between the near-RT RIC 102-1 and the CU/DU protocol stack software. Analogous to an interface between the Radio Resource Management (RRM) and Radio Resource Control (RRC) of traditional devices, the near-RT RIC 102-1 not only collects measurement information of each functional unit of the radio network through the E2 interface, but also sends control commands to the base station through this interface, and finally controls behavior of the base station. Under the open software architecture, through standardization of the E2 interface, an iterative evolution capability of near-RT RIC function software independent of traditional base station software versions can be realized, and time-to-market of software functions can be shortened.

The 5G protocol supports the network slice function. In the existing O-RAN scheme, the non-RT RIC 101-1 evaluates network congestion to support physical resource division of the network slices.

Figure 2:
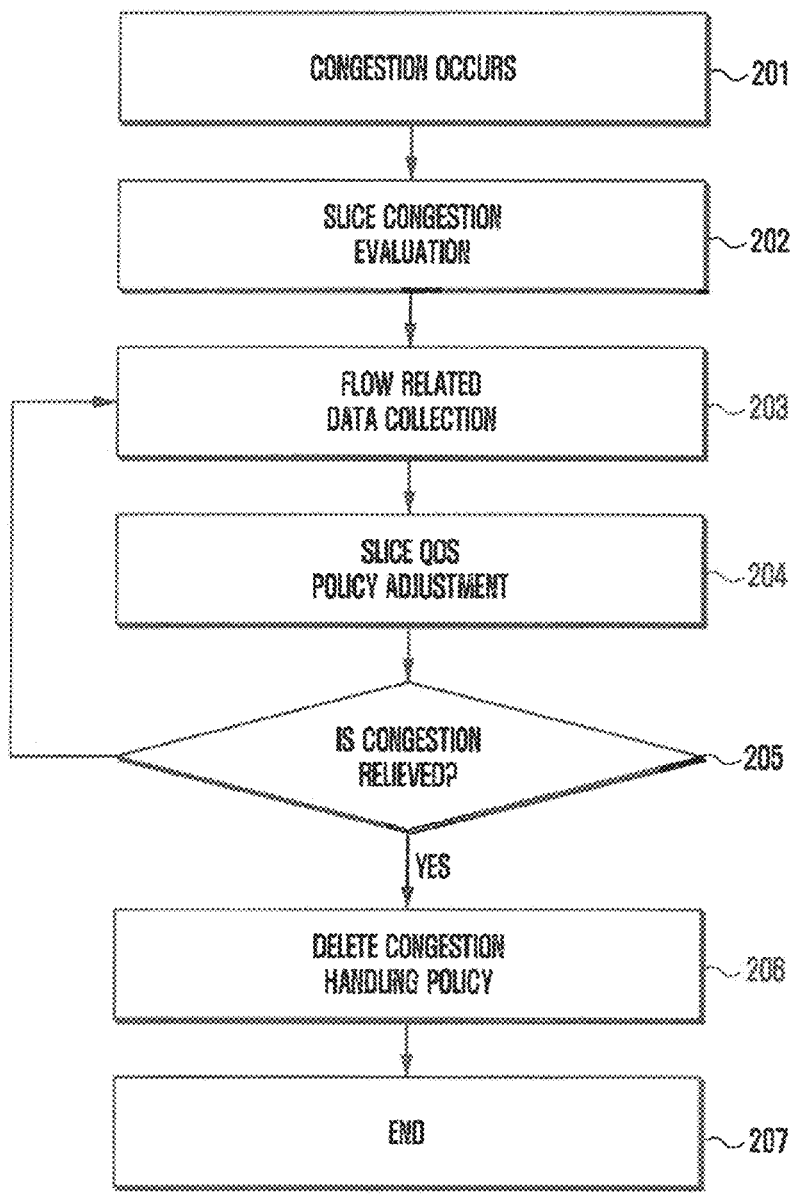
FIG. 2 illustrates a flow chart of an example physical resource division of an O-RAN slice.

FIG. 2 illustrates a flow chart of an example of physical resource division of an O-RAN slice. The following description will refer to FIG. 2.

In step 201, the physical resource division is triggered by an external system 105. The external system 105 is an external system that can provide enrichment data for the SMO 101, such as an application server, etc.

In step 202, the SMO 101 assists the Non-RT RIC 101-1 to collect common internal and external data, and the Non-RT RIC 101-1 completes slice congestion evaluation. In the slice congestion evaluation, it is necessary to use an artificial intelligence/machine learning (AI/ML) module in the Non-RT RIC 101-1 based on the external data. The external data is, for example, a message on the application server related to natural disasters, etc., that will cause network congestion.

In step 203, the SMO 101 further collects traffic related data according to further congestion evaluation requirements of the Non-RT RIC 101-1. The further congestion evaluation requirements include evaluation requirements of congestion degree, etc. The traffic related data may be from measurement reporting by an O1 interface or from the external system 105.

In step 204, based on the collected relevant data, the Non-RT RIC 101-1 completes slice QoS (Quality of Service) policy adjustment based on AI/ML training and configures the same to O-RAN network function entities 102. The policy adjustment includes adjusting the number of physical resource blocks (PRB) of the slice.

In step 205, the Non-RT RIC 101-1 completes congestion evaluation.

If the congestion is relieved, then in step 206, the relevant congestion handling policy is deleted.

Next, ORAN-based system performance optimization according to embodiments of the present disclosure will be described with reference to FIGS. 3 to 9.

Massive multiple input multiple output (massive MIMO) technology is the key technology of 5G and 4.5G (4.5th-Generation). In a time division duplexing (TDD) massive MIMO system, uplink channel information is measured by a sounding reference signal (SRS), and downlink channel information is obtained by channel reciprocity. The downlink channel information may also be measured by configuring a channel state information reference signal (CSI-RS), and the user feeds back channel state information (CSI), including precoding matrix index (PMI), rank information (RI), and channel quality indicator (CQI). In a frequency division duplexing (FDD) massive MIMO system, since uplink and downlink channels are not on the same frequency resources, a base station may not obtain the downlink channel information through the SRS by using channel reciprocity, however, by configuring the CSI-RS, it can obtain the downlink channel information from the feedback of the user.

When the base station obtains the channel information, the base station (the gNB or eNB) realizes signal transmission by beamforming. Depending on whether a signal transmitted by one base station on the same time-frequency resources belongs to one user or multiple users, massive MIMO transmission methods are divided into two modes: multi-user multiple input multiple output (MU-MIMO) and single-user multiple input multiple output (SU-MIMO). Based on different methods of obtaining the channel state information, transmission methods may also be subdivided into SRS-based MU-MIMO, PMI-based MU-MIMO, SRS-based SU-MIMO, and PMI-based SU-MIMO. The PMI-based MU-MIMO may also be divided into Type I codebook-based MU-MIMO, Type II codebook-based MU-MIMO, type I codebook-based SU-MIMO, and Type II codebook-based SU-MIMO, etc. If multiple stations are allowed to transmit data to users in coordination, the transmission method can also include coordinated multiple point (CoMP), etc. To sum up, the base station can select a specific transmission method for one user according to requirements. It is understood that a user can refer to a terminal, user equipment (UE), mobile device, or any other suitable device.

In actual deployment, different transmission methods (or modes) have different transmission spectrum efficiencies in different application scenarios. For example, in an actual system, a downlink Massive MIMO system may support up to 8 or 16 layers of multi-user data transmission, and the SRS-based MU-MIMO mode may achieve the highest spectrum efficiency under the conditions of high SRS channel quality, motionless users, and large traffic packets. However, when the channel quality of SRS decreases, a user moves, or a user only has small traffic packets, the transmission efficiency of the SRS-based MU-MIMO mode may be greatly reduced, even lower than that of the SU-MIMO transmission mode.

In an actual system, the base station will try its best to select an appropriate transmission method for a user. In the existing non-O-RAN system, although the base station may measure the CSI and reference signal received power (RSRP) of the user, it is difficult to obtain information related to the user's movement speed and it is difficult to predict the user's movement situation. Although the base station can obtain current buffer occupation (BO) information of the user, it is difficult to predict a subsequent traffic situation of the user. Although the base station can obtain CSI feedback, it is difficult to predict subsequent channel quality changes. Generally speaking, when configuring one user to use one transmission method, the base station needs to give relevant configuration information through radio resource control (RRC) signaling. For example, SRS parameters need to be configured for users in the SRS-based MU-MIND transmission. A particular transmission method will be used in several subsequent transport time intervals (TTI), once that transmission method is configured to be used. That is, the transmission method decided by the base station is applied to some subsequent time, not only the current time. Therefore, it is more appropriate to decide the transmission method of the user based on the predicted mobility and scenario information.

In addition, the Non-RT RIC 101-1 of the O-RAN can recommend optimized configuration parameters for the transmission method of each base station according to information such as the number of users reported by each cell.

The SMO 101 of the O-RAN obtains rich user data from an application server 105. Based on these data, the related prediction of user mobility, channel quality, and traffic volume can be obtained by using AI/ML of the Non-RT RIC 101-1 or AI/ML of the Near-RT RIC 102-1. If the above information is used to help implement decisions on transmission methods of the users, the rationality of the decision and the transmission efficiency of the system will be greatly improved.

5G defines three application scenarios: enhanced mobile broadband (eMBB), ultra-reliable low latency communications (uRLLC), and massive machine type communications (mMTC). The application scenarios of eMBB, for example, mainly refer to mobile Internet large flow consumer applications such as 4K/8K high-definition video, augmented reality/virtual reality (AR/VR), 3D holography, etc.

In the definition of the 5G protocol, the coexistence of the three application scenarios is supported by network slice technology. That is, a same network entity supports multiple slices, and each slice supports one application scenario. At the same time, the 5G protocol also supports customized slicing, in which a dedicated slice may be defined by traffic and implementation requirements.

Using the slicing function, the O-RAN may put users suited for different transmission methods into different sub-slices, and inform the base station of the transmission method suitable for each sub-slice. In this way, the transmission method used for users in the base station will be more suitable, and because different slices use independent resources the scheduling and transmission of the base station will be further simplified.

Since a 4G or 4.5G eNB or gNB does not support slicing and/or sub-slice functionality, information on user attributes, traffic situations, mobile situations, etc., may be added on an O1 or an E2 interface, and this information is provided to the eNB. The eNB may select an appropriate transmission method and appropriate configuration parameters and the like for users through richer user and scenario information, which will also greatly improve rationality of the decision and the transmission efficiency of the system.

In view of the above problems, this disclosure proposes an O-RAN-based system performance optimization scheme, which achieves the objectives of user transmission method selection or configuration parameter (such as discontinuous reception (DRX) configuration) optimization by obtaining rich data provided by the external system 105, which is user status data such as global positioning system (GPS) information provided by an application server, traffic information collected by a traffic server, etc., combining the rich data with internal monitoring information reported by RAN nodes, using the AI module (AI/ML function) in the Non-RT RIC 101-1 or the Near-RT RIC 102-1 for a prediction or decision process, and then transmitting results of the prediction or decision process to relevant functional modules in the RAN nodes.

According to the different data processing methods of the RIC (the Non-RT RIC 101-1 and the Near-RT RIC 102-1 are collectively referred to as the RIC herein), embodiments of this disclosure can be divided into two categories: in a first category, which is denoted as class A, the RIC directly participates in a decision and uses slicing to realize the decision; in a second category, which is denoted as class B, the RIC makes a prediction and assists modules in the RAN nodes to do optimization processing. Based on the difference in data sources and data classification, scenarios may be divided into mobility scenarios, traffic scenarios, and mixed mobility and traffic scenarios. Therefore, based on the classification and scenarios, the following examples are listed in this disclosure for illustration.

Embodiment A-1: slice-based system performance optimization in a mobility scenario of users;

Embodiment A-2: slice-based system performance optimization in a traffic scenario;

Embodiment A-3: slice-based system performance optimization in a mobility and traffic scenario;

Embodiment A-4: slice-based configuration parameters optimization;

Embodiment B-1: prediction-based system performance optimization in a mobility scenario of a user;

Embodiment B-2: prediction-based system performance optimization in a traffic scenario; and Embodiment B-3: prediction-based configuration parameters optimization.

Those skilled in the art will understand that this disclosure is not limited to the above-mentioned embodiments, and any case in which the relevant innovations of this disclosure are used or the innovations of this disclosure are combined belongs to the claimed protection scope of this disclosure.

Embodiment A-1

Figure 3:
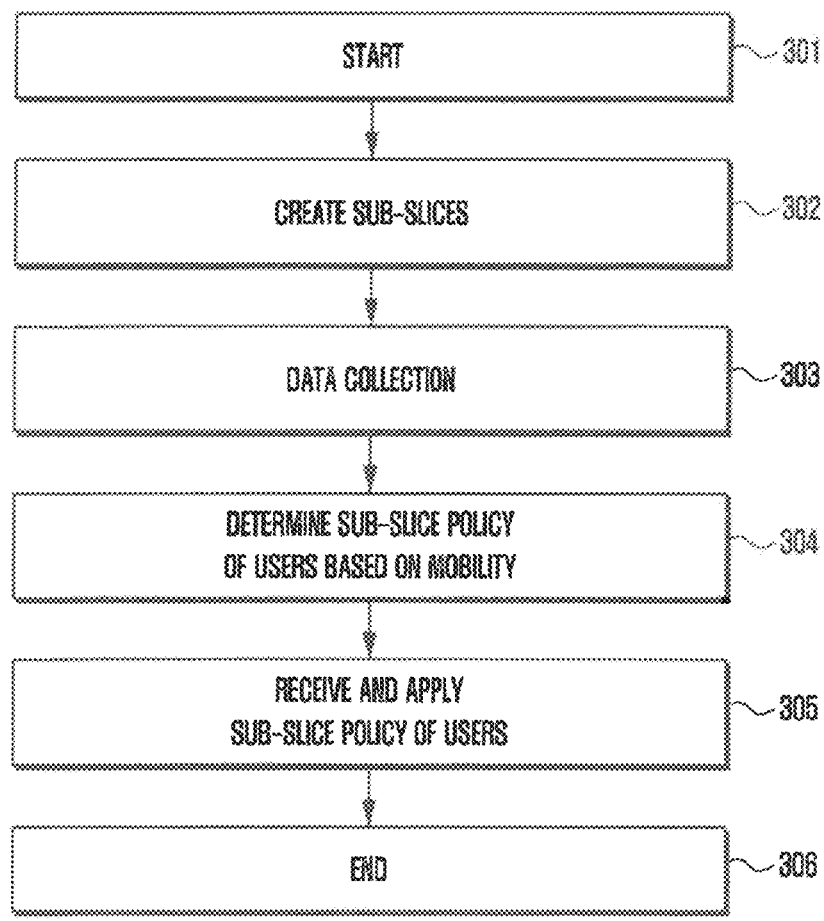
FIG. 3 illustrates slice-based system performance optimization in a mobility scenario of a user according to an embodiment of the present disclosure.

FIG. 3 illustrates slice-based system performance optimization in a mobility scenario of a user according to an embodiment of the present disclosure. The description will be made below with reference to FIG. 3.

In step 301, the slice-based system performance optimization method starts during O-RAN slice execution. Compared with the standard methods, the slice resource optimization method is not triggered by congestion events, but may be triggered based on a configuration or may periodically execute. For example, a slice resource optimization function is enabled according to the requirements of slice service providers or slice customers, or in one embodiment of an O-RAN system, the slice optimization function is always enabled.

Compared with existing slice resource division methods that are congestion triggered, the slice resource optimization method of the present disclosure can be performed periodically. For the Non-RT RIC 101-1, seconds-level (or near-real time) policy prediction may be supported, which is more dynamic than the existing methods. Specifically, slice resource division is triggered by congestion events in the existing methods, and the scale of the congestion event may be several days, months, or hours. Meanwhile, embodiments of the present disclosure may operate at the seconds-level by using the Non-RT RIC 101-1 and at the milliseconds level by using the Near-RT RIC 102-1.

In step 302, a network slice subnet instance (NSSI), or sub-slice, is created by a network slice subnet management function (NSSMF), or sub-slice management module of, for example, the SMO 101.

Single network slice selection assistance information (S-NSSAI) defines an end-to-end network slice. See 3GPP TS 23.003 for details.

The S-NSSAI is a 32-bit identifier, including 8-bit slice/service type (SST) and 24-bit slice differentiator (SD).

A set of S-NSSAIs constitutes network slice selection assistance information (NSSAI). To support implementation of the NSSAI, the network will deploy one or more network slice instances (NSIs), and deploy one or more NSSIs at the same time. The NSSI constitutes all or part of the modules of the NSI. One NSSI may belong to one NSI or multiple NSIs. One NSI may be composed of one NSSI or multiple NSSIs.

The present disclosure proposes that in an O-RAN system, at least two NSSIs need to be created. In network implementation, different NSSIs correspond to different preferred transmission methods, such as MU-MIMO or SU-MIMO.

The preferred transmission method mentioned here as corresponding to an NSSI does not mean that all users in this NSSI only support the preferred transmission method and do not support other transmission methods.

For example, in the NSSI where SRS-based MU-MIMO is adopted as the preferred transmission method, when SRS information of users is incomplete, users may temporarily fall back to use the SU-MIMO transmission.

The sub-slice management module creates at least two sub-slice instances on a RAN side, which respectively support different transmission methods. Sub-slices may belong to a same slice instance or different slice instances, but all belong to a same S-NSSAI. Users do not need to update S-NSSAI during a sub-slice instance handover. Therefore, signaling overhead is reduced, seamless soft handover may be realized and impact on traffic transmission is minimized as much as possible.

In standard methods, there is no design to divide sub-slices based on the preferred transmission method, so there is no information related to the transmission method in the sub-slice attributes. In this disclosure, information representing the preferred transmission method of the NSSI is added to an NSSI information interface of the O-RAN system.

Specifically, a separate information element (IE) may be added to the NSSI to identify the preferred transmission method of the NSSI, or the preferred transmission method of the NSSI may be expressed by a regular method of naming NSSI strings, or the preferred transmission method of the NSSI may be indicated in an implicit way, for example, by the user movement speed range supported by the NSSI.

The advantages of using transmission method-based sub-slices in the embodiments of the present disclosure are that users of two transmission methods are separated from physical resources, the mutual influence between different transmission methods is eliminated, the sub-slices of different transmission methods are conveniently managed and measured individually, and the processing complexity of the base station is reduced. At the same time, signaling overhead may be saved by informing the base station of the preferred transmission method through the sub-slices.

In step 303, data is collected. The SMO module 101 collects user mobility related information (such as spatial coordinates, GPS information, orientation information relative to the base station, surrounding environment distribution information, maps, etc.) from an application server 105, and the above information is used to estimate and predict mobility of each user in each cell in the slice.

Communication capability information of the user, such as SRS reporting capability, supported type of demodulation reference signal (DMRS), supported number of DMRS symbols, etc., is obtained by the SMO 101 from a network function 102 through an O1 interface, by the Non-RT RIC 101-1 from the Near-RT RIC 102-1 through an A1 interface, or by the Near-RT RIC 102-1 from the network functions through an E2 interface. The above information is used to determine the set of supportable transmission methods of each user in each cell in the slice.

Communication capability information of the cell, such as whether MU-MIMO transmission is supported, whether SU-MIMO transmission is supported, maximum transmission layers of MU-MIMO, maximum transmission layers of SU-MIMO, whether CoMP transmission is supported, etc., is obtained by the SMO 101 from the network functions 102 through the O1 interface, by the Non-RT RIC 101-1 from the Near-RT RIC 102-1 through the A1 interface, or by the Near-RT RIC 102-1 from the network functions through the E2 interface. The above information is used to determine the set of supportable transmission methods in each cell in the slice.

Slice-related measurement information, such as the number of online users, throughput, physical resource block (PRB) utilization, etc., is obtained by the SMO 101 from the network functions 102 through the O1 interface, or by the Non-RT RIC 101-1 from the Near-RT RIC 102-1 through the A1 interface, or by the Near-RT RIC 102-1 from network functions through the E2 interface. The above information is used to determine an overall load of the slice.

Data is collected and then summarized in an RIC module for AI processing.

In a case where the RIC module is the Non-RT RIC 101-1, the SMO 101 transfers information collected by the SMO 101 to the Non-RT RIC module 101-1 through an internal bus, and the Near-RT RIC 102-1 transfers the information collected by the Near-RT RIC 102-1 to the Non-RT RIC module 101-1 through the A1 interface.

In a case where the RIC module is the Near-RT RIC 102-1, the SMO 101 transfers the information collected by the SMO 101 to the Non-RT RIC module 101-1 through the internal bus, then it is further transferred to the Near-RT RIC 102-1 module by the Non-RT RIC 101-1 through the A1 interface, and the network functions 102 transfer the information to the Near-RT RIC module 102-1 through the E2 interface.

In standard methods, there is no use case including collecting information related to a transmission method decision, and determining (or deciding) the transmission method by using the ability of the RIC to estimate and measure user mobility.

The advantages of using traffic information in the embodiments of the present disclosure are that user's traffic model can be known, the time when the traffic occurs can be predicted, resources can be prepared for the user in advance, processing delay can be reduced, user experience can be improved, and SLA (Service Level Agreement) requirements can be met. The advantage of using user capability information is that high-performance terminals use MU-MIMO and low-performance terminals use SU-MIMO, which reduces unnecessary retransmission and improves resource utilization. Different levels of terminals have different downlink data transmission capabilities. According to the 3GPP protocol, the terminal may support at least one layer of downlink data stream and at most eight layers of downlink data stream. When demodulating downlink data, high-performance terminals can eliminate interference of multiplexing users and demodulate their own original data.

In step 304, a sub-slice policy of the user is determined. The RIC (the Non-RT RIC 101-1 and/or the Near-RT RIC 102-1) selects a preferred transmission method for each user in each cell in the slice by executing an AI module based on the collected data, and puts (or allocates) the users into corresponding sub-slices.

In some embodiments, the decision process can be completed by the Non-RT RIC 101-1, and the decision is transferred to the Near-RT RIC 102-1 through the A1 interface, and then transferred to the network functions 102 by the Near-RT RIC 102-1 through the E2 interface.

In some embodiments, this decision process may be completed by the Non-RT RIC 101-1, and the decision is shared with the SMO 101 through the SMO internal bus, and then transferred to the network functions 102 by the SMO 101 through the O1 interface.

In some embodiments, the AI module may be executed by the Near-RT RIC 101-1 to complete this decision process, and the decision is transferred to the network functions 102 through the E2 interface.

In some embodiments, the Non-RT RIC 101-1 and the Near-RT RIC 102-1 may respectively execute the AI module to complete this decision process. The Non-RT RIC 101-1 transfers the decision and the trained model training to the Near-RT RIC 102-1 through the A1 interface, and the Near-RT RIC 102-1 further executes the AI module, based on information transferred by the Non-RT RIC 101-1 and information transferred by the E2 interface, to complete a final decision and transfers the final decision to the network functions 102 through the E2 interface.

In some embodiments, after the decision is made the user transmission method is transferred to the network functions 102 through the sub-slice method, for example, by enumerating the allocated user labels for each sub-slice, and, for example, by marking the allocated sub-slice label for each user.

In the standard methods, there is no interface message for transferring the preferred transmission method information to users. The above interface message is introduced in this disclosure to realize a sub-slice optimization transmission method selection function.

For an implementation in which the Non-RT RIC 101-1 executes the AI module to determine the preferred transmission method, information related to the preferred transmission method needs to be added on the A1 interface and the E2 interface.

For an implementation in which the Near-RT RIC 102-1 executes the AI module to determine the preferred transmission method, information related to the preferred transmission method needs to be added on the E2 interface.

For an implementation in which the Non-RT RIC 101-1 and the Near-RT RIC 102-1 execute the AI module to complete this decision together, Non-RT RIC 101-1 training results and information of model deployment needs to be added on the A1 interface, and information related to the preferred transmission method needs to be added on the E2 interface. The Non-RT RIC 101-1 training results added on the A1 interface may be the preferred transmission method information of each user, movement speed level information of each user, or movement model information of each user and so on.

In step 305, the sub-slice policy of the user is received and applied. After receiving sub-slice information of the user through the O1 interface or the E2 interface, the network function 102 deletes user information in the original sub-slice instance and establishes user information in the indicated sub-slice instance.

Whether the O1 interface or the E2 interface is used to receive the policy information depends on which method is specifically adopted in step 304. The network function 102 may receive the policy information through either the O1 interface or the E2 interface in cases in which the Non-RT RIC 101-1 makes the decision. The network function 102 may receive the policy information through the E2 interface in cases in which the Near-RT RIC 102-1 makes the decision, or the Non-RT RIC 101-1 and the Near-RT RIC 102-1 jointly make decision.

After the network function 102 completes the reception of the policy, it will complete RRC configuration or media access control (MAC) scheduling of the user according to the sub-slice policy.

The embodiments of the disclosure are operated based on the sub-slice instance, which may separate the transmission methods from the physical resources and eliminate the mutual influence between different transmission methods. The operation of the user during the sub-slice handover is given.

To support the implementation of the above process, other auxiliary steps may be added.

For example, the network function module 102 may inform the SMO 101 through the O1 interface whether the network function modules 102 or the cell supports the preferred transmission method-based sub-slice function. The flow in FIG. 3 is only performed for the network function module 102 or cell supporting this function.

For example, the network function module 102 may further report some measurement data to help the RIC evaluate effects of the preferred transmission method policy, so as to help the RIC optimize an algorithm or terminate the preferred transmission method-based sub-slice function.

According to the above embodiments, by measuring mobility, different transmission methods are selected for users in different scenarios, and the selected transmission methods are implemented by the slice policy, RRC configuration, or a MAC scheduling policy, so as to achieve the improvement of performance in aspects of improving the throughput of the base station system, improving the user experience, and helping the terminal save power, etc.

Embodiment A-2

Figure 4:
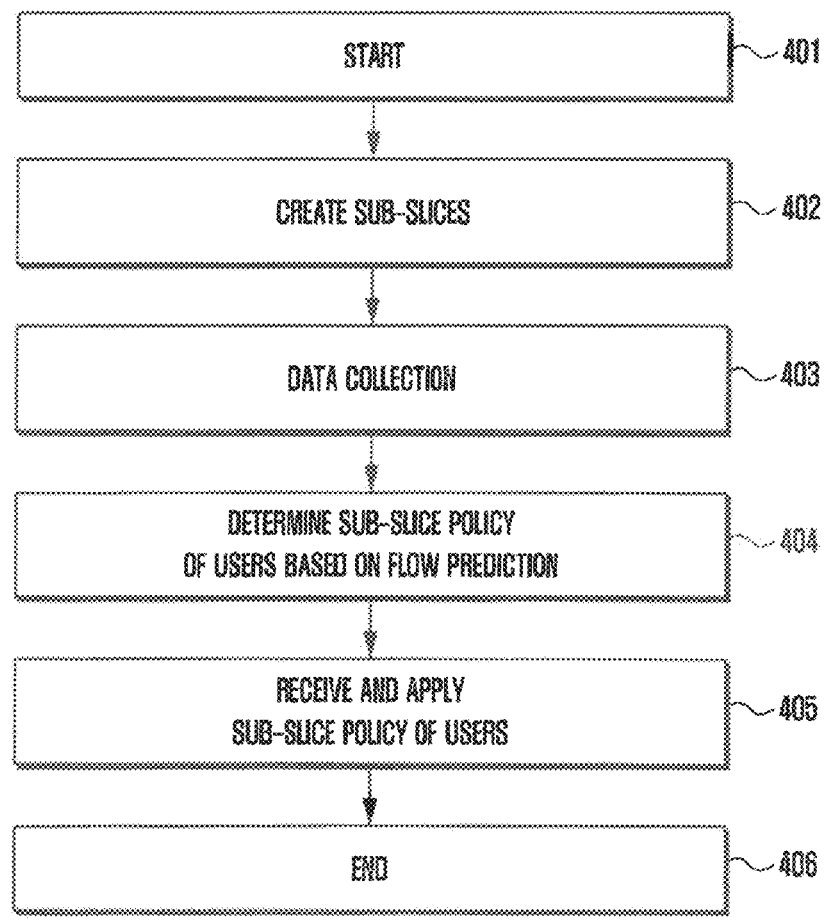
FIG. 4 illustrates slice-based system performance optimization in a traffic prediction scenario of a user according to an embodiment of the present disclosure.

FIG. 4 illustrates slice-based system performance optimization in a flow prediction scenario of a user according to an embodiment of the present disclosure. The description will be made below with reference to FIG. 4.

In step 401, the slice-based system performance optimization method starts during the O-RAN slice execution, which is the same as step 301.

Step 402 is the same as step 302.

In step 403, data is collected. An SMO module 101 collects user flow prediction related information (e.g., a mobile application in use, whether in office or driving, etc.) from an application server 105, and the above information is used to estimate and predict the flow of each user in each cell in the slice.

Communication capability information of the user, e.g., configuration information or performance indicators such as SRS reporting capability, supported type of DMRS, supported number of DMRS symbols, etc., is obtained by the SMO 101 from a network function 102 through an O1 interface, by the Non-RT RIC 101-1 from the Near-RT RIC 102-1 through an A1 interface, or by the Near-RT RIC 102-1 from the network function 102 through an E2 interface. The above information is used to determine the set of supportable transmission methods of each user in each cell in the slice.

Communication capability information of the cell, e.g., configuration information or performance indicators such as whether MU-MIMO transmission is supported, whether SU-MIMO transmission is supported, maximum transmission layers of MU-MIMO, maximum transmission layers of SU-MIMO, whether CoMP transmission is supported, etc., is obtained by the SMO 101 from the network function 102 through the O1 interface, by the Non-RT RIC 101-1 from the Near-RT RIC 102-1 through the A1 interface, or by the Near-RT RIC 102-1 from the network function 102 through the E2 interface. The above information is used to determine the set of supportable transmission methods in each cell in the slice.

Slice-related measurement information, such as the number of online users, throughput, physical resource block (PRB) utilization, etc., is obtained by the SMO 101 from the network function 102 through the O1 interface, or by the Non-RT RIC 101-1 from the Near-RT RIC 102-1 through the A1 interface, or by the Near-RT RIC 102-1 from the network function 102 through the E2 interface. The above information is used to determine an overall load of the slice.

Data is collected and then summarized in an RIC module for AI processing.

In a case in which the RIC module is the Non-RT RIC 101-1, the SMO 101 transfers information collected by the SMO 101 to the Non-RT RIC module 101-1 through an internal bus, and the Near-RT RIC 102-1 transfers the information collected by the Near-RT RIC 102-1 to the Non-RT RIC module 101-1 through the A1 interface.

In a case in which the RIC module is the Near-RT RIC 102-1, the SMO 101 transfers the information collected by the SMO 101 to the Non-RT RIC module 101-1 through the internal bus, so that the same is further transferred to the Near-RT RIC module 102-1 by the Non-RT RIC 101-1 through the A1 interface, and the network function 102 transfers the information to the Near-RT RIC module 102-1 through the E2 interface.

In the standard methods, there is no use case including collecting information related to a transmission method decision and determining (or deciding) the transmission method by using the ability of the RIC to estimate and measure user flow.

The advantages of using traffic information in the embodiments of the present disclosure are that user's traffic model may be known, the time when the traffic occurs may be predicted, resources may be prepared for the user in advance, processing delay may be reduced, user experience may be improved, and SLA requirements may be met. The advantage of using user capability information is that high-performance terminals use MU-MIMO and low-performance terminals use SU-MIMO, which reduces unnecessary retransmission and improves resource utilization. Different levels of terminals have different downlink data transmission capabilities. According to the 3GPP protocol, the terminal may support at least one layer of downlink data stream and at most eight layers of downlink data stream. When demodulating downlink data, high-performance terminals may eliminate interference of multiplexing users and demodulate original data.

Step 404 is the same as step 304.

Step 405 is the same as step 305.

To support the implementation of the above process, other auxiliary steps may be added.

For example, the network function module 102 may inform the SMO 101 through the O1 interface whether the network function module 102 or the cell supports the preferred transmission method-based sub-slice function. The flow in FIG. 4 is only performed for the network function module 102 or cell supporting this function.

For example, the network function module 102 may further report some measurement data to help the RIC evaluate effects of the preferred transmission method policy, so as to help the RIC optimize an algorithm or terminate the preferred transmission method-based sub-slice function.

According to the above embodiments, by measuring flow of a traffic type, different transmission methods are selected for users in different scenarios, and the selected transmission methods are implemented by the slice policy, RRC configuration, or a MAC scheduling policy, so as to achieve the improvement of performance in aspects of improving the throughput of the base station system, improving the user experience, and helping the terminal save power, etc.

Embodiment A-3

Figure 5:
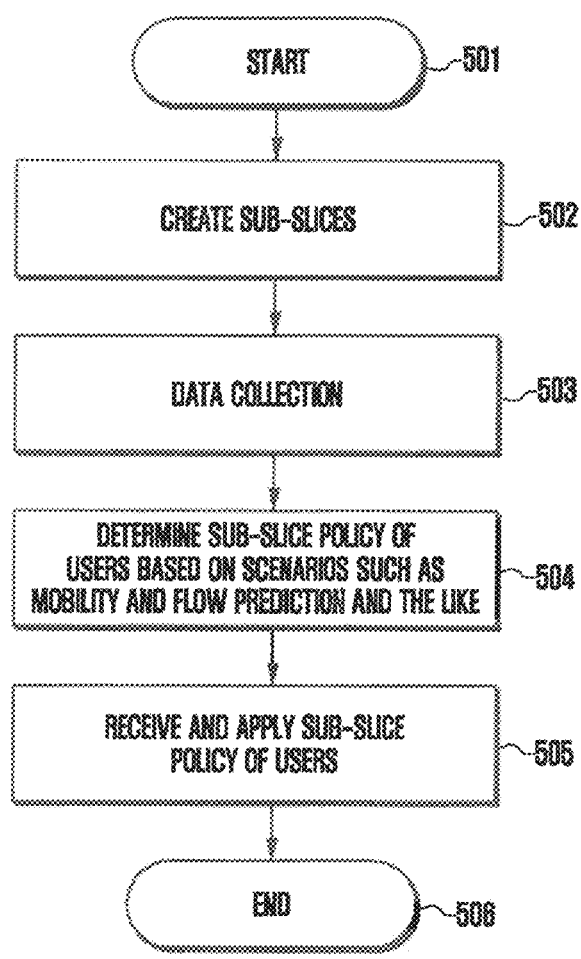
FIG. 5 illustrates slice-based system performance optimization in a mobility scenario and a traffic scenario of a user according to an embodiment of the present disclosure.

FIG. 5 illustrates slice-based system performance optimization in a mobility scenario and a traffic scenario of a user according to an embodiment of the present disclosure. The description will be made below with reference to FIG. 5.

In step 501, the slice-based system performance optimization method starts during the O-RAN slice execution, which is the same as step 301.

Step 502 is the same as step 302.

In step 503, data is collected. The SMO module 101 collects from the application server 105: user mobility related information (such as spatial coordinates, GPS information, orientation information relative to the base station, surrounding environment distribution information, maps, etc.), which is used to estimate and predict the mobility of each user in each cell in the slice; and user flow prediction related information (e.g., a mobile application in use, whether in office or driving, etc.), which is used to estimate and predict the flow of each user in each cell in the slice.

Communication capability information of the user, e.g., configuration information or performance indicators such as SRS reporting capability, supported type of DMRS, supported number of DMRS symbols, etc., is obtained by the SMO 101 from a network function 102 through an O1 interface, by the Non-RT RIC 101-1 from the Near-RT RIC 102-1 through an A1 interface, or by the Near-RT RIC 102-1 from the network function 102 through an E2 interface. The above information is used to determine the set of supportable transmission methods of each user in each cell in the slice.

Communication capability information of the cell, e.g., configuration information or performance indicators such as whether MU-MIMO transmission is supported, whether SU-MIMO transmission is supported, maximum transmission layers of MU-MIMO, maximum transmission layers of SU-MIMO, whether CoMP transmission is supported, etc., is obtained by the SMO 101 from the network function 102 through the O1 interface, by the Non-RT RIC 101-1 from the Near-RT RIC 102-1 through the A1 interface, or by the Near-RT RIC 102-1 from the network function 102 through the E2 interface. The above information is used to determine the set of supportable transmission methods in each cell in the slice.

Slice-related measurement information, such as a number of online users, throughput, physical resource block (PRB) utilization, etc., is obtained by the SMO 101 from the network function 102 through the O1 interface, or by the Non-RT RIC 101-1 from the Near-RT RIC 102-1 through the A1 interface, or by the Near-RT RIC 102-1 from the network function 102 through the E2 interface. The above information is used to determine an overall load of the slice.

Data is collected and then summarized in an RIC module for AI processing.

In a case in which the RIC module is the Non-RT RIC 101-1, the SMO 101 transfers information collected by the SMO 101 to the Non-RT RIC module 101-1 through an internal bus, and the Near-RT RIC 102-1 transfers the information collected by the Near-RT RIC 102-1 to the Non-RT RIC module 101-1 through the A1 interface.

In a case in which the RIC module is the Near-RT RIC 102-1, the SMO 101 transfers the information collected by the SMO 101 to the Non-RT RIC module 101-1 through the internal bus, so that the same is further transferred to the Near-RT RIC module 102-1 by the Non-RT RIC 101-1 through the A1 interface, and the network function 102 transfers the information to the Near-RT RIC module 102-1 through the E2 interface.

In the standard methods, there is no use case including collecting information related to a transmission method decision and deciding (or determining) the transmission method by using the ability of the RIC to estimate and measure user mobility and flow.

The advantages of using traffic information in the embodiments of the present disclosure are that user's traffic model may be known, the time when the traffic occurs may be predicted, resources may be prepared for the user in advance, processing delay may be reduced, user experience may be improved, and SLA requirements may be met. The advantage of using user capability information is that high-performance terminals use MU-MIMO and low-performance terminals use SU-MIMO, which reduces unnecessary retransmission and improves resource utilization. Different levels of terminals have different downlink data transmission capabilities. According to the 3GPP protocol, the terminal may support at least one layer of downlink data stream and at most eight layers of downlink data stream. When demodulating downlink data, high-performance terminals may eliminate interference of multiplexing users and demodulate original data.

Step 504 is the same as step 304.

Step 505 is the same as step 305.

To support the implementation of the above process, other auxiliary steps may be added.

For example, the network function module 102 may inform the SMO 101 through the O1 interface whether the network function module 102 or the cell supports the preferred transmission method-based sub-slice function. The flow in FIG. 5 is only performed for the network function module 102 or cell supporting this function.

For example, the network function module 102 may further report some measurement data to help the RIC evaluate effects of the preferred transmission method policy, so as to help the RIC optimize an algorithm or terminate the preferred transmission method-based sub-slice function.

According to the above embodiments, by measuring user traffic volume, a traffic type and the mobility, etc., different transmission methods are selected for users in different scenarios, and the selected transmission methods are implemented by the slice policy, RRC configuration, or a MAC scheduling policy, so as to achieve the improvement of performance in aspects of improving the throughput of the base station system, improving the user experience, and helping the terminal save power, etc.

Embodiment A-4

Figure 6:
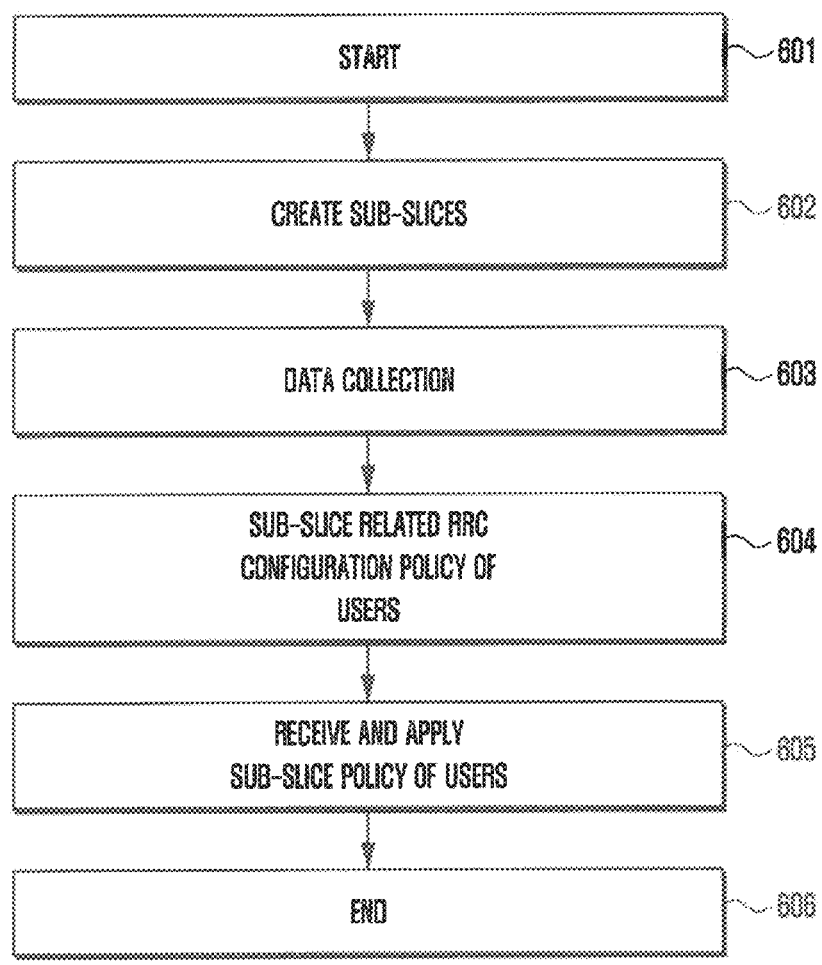
FIG. 6 illustrates slice-based configuration parameters optimization according to an embodiment of the present disclosure.

FIG. 6 illustrates slice-based configuration parameters optimization according to an embodiment of the present disclosure. The description will be made below with reference to FIG. 6.

In step 601, the slice-based configuration parameters optimization method starts during the O-RAN slice execution, which is the same as step 301.

Step 602 is the same as step 302.

In step 603, data is collected. An SMO module 101 collects user scenario related information from an application server 105, such as mobility prediction, flow prediction, network congestion prediction, and so on.

Communication capability information of a user, e.g., configuration information or performance indicators such as SRS reporting capability, supported type of DMRS, supported number of DMRS symbols, etc., is obtained by the SMO 101 from a network function 102 through an O1 interface, by the Non-RT RIC 101-1 from the Near-RT RIC 102-1 through an A1 interface, or by the Near-RT RIC 102-1 from the network function 102 through an E2 interface. The above information is used to determine the set of supportable transmission methods of each user in each cell in the slice.

Communication capability information of a cell, e.g., configuration information or performance indicators such as whether MU-MIMO transmission is supported, whether SU-MIMO transmission is supported, maximum transmission layers of MU-MIMO, maximum transmission layers of SU-MIMO, whether CoMP transmission is supported, etc., is obtained by the SMO 101 from the network function 102 through the O1 interface, by the Non-RT RIC 101-1 from the Near-RT RIC 102-1 through the A1 interface, or by the Near-RT RIC 102-1 from the network function 102 through the E2 interface. The above information is used to determine the set of supportable transmission methods in each cell in the slice.

Slice-related measurement information, such as a number of online users, throughput, PRB utilization, etc., is obtained by the SMO 101 from the network function 102 through the O1 interface, or by the Non-RT RIC 101-1 from the Near-RT RIC 102-1 through the A1 interface, or by the Near-RT RIC 102-1 from the network function 102 through the E2 interface. The above information is used to determine an overall load of the slice.

Data is collected and then summarized in an RIC module for AI processing.

In a case in which the RIC module is the Non-RT RIC 101-1, the SMO 101 transfers information collected by the SMO 101 to the Non-RT RIC module 101-1 through an internal bus, and the Near-RT RIC 102-1 transfers the information collected by the Near-RT RIC 102-1 to the Non-RT RIC module 101-1 through the A1 interface.

In a case in which the RIC module is the Near-RT RIC 102-1, the SMO 101 transfers the information collected by the SMO 101 to the Non-RT RIC module 101-1 through the internal bus, so that the same is further transferred to the Near-RT RIC module 102-1 by the Non-RT RIC 101-1 through the A1 interface, and the network function 102 transfers the information to the Near-RT RIC module 102-1 through the E2 interface.

At step 604, a sub-slice policy of the user is determined. The RIC (the Non-RT RIC 101-1 and/or the Near-RT RIC 102-1) optimizes RRC configuration parameters for sub-slices of different transmission methods in the slice, or for each user of sub-slices of different transmission methods in the slice, by executing an AI module based on collected data.

In some embodiments, the decision process may be completed by the Non-RT RIC 101-1, and the decision is transferred to the Near-RT RIC 102-1 through the A1 interface, and then transferred to the network function 102 by the Near-RT RIC 102-1 through the E2 interface.

In some embodiments, this decision process may be completed by the Non-RT RIC 101-1, and the decision is shared with the SMO 101 through the SMO internal bus, and then transferred to the network function 102 by the SMO 101 through the O1 interface.

In some embodiments, the AI module may be executed by the Near-RT RIC 102-1 to complete this decision process, and the decision is transferred to the network function 102 through the E2 interface.

In some embodiments, the Non-RT RIC 101-1 and the Near-RT RIC 102-1 may jointly execute the AI module to complete this decision process. The Non-RT RIC 101-1 transfers the decision and the trained model to the Near-RT RIC 102-1 through the A1 interface, and the Near-RT RIC 102-1 further executes the AI module based on information transferred by the Non-RT RIC 101-1 and information transferred by the E2 interface to complete a final decision, and transfers the final decision to the network function 102 through the E2 interface.

In some embodiments, the RRC configuration parameters after the decision is made may be transferred to the network function 102 in a sub-slice manner, for example, by listing, for each sub-slice, corresponding RRC configuration parameter information, such as DRX information for terminal nodes, SRS information for channel measurement, DMRS information for CSI-RS information for CSI measurement and codebook configuration information, etc.

In some embodiments, the RRC configuration parameters after the decision is made may be transferred to the network function module 102 in the form of RRC parameters of each user, for example, by listing, for each user in each sub-slice, corresponding RRC configuration parameter information, such as DRX information for terminal nodes, SRS information for channel measurement, DMRS information for channel estimation, CSI-RS information for CSI measurement and codebook configuration information, etc.

In the standard methods, there is no interface message for transferring RRC configuration parameters of users. The above interface messages are introduced in this disclosure to realize a sub-slice preferred RRC configuration parameters function.

For an implementation in which the Non-RT RIC 101-1 executes the AI module to determine the preferred RRC configuration parameters, information related to the preferred transmission method needs to be added on the A1 interface and the E2 interface.

For an implementation in which the Near-RT RIC 102-1 executes the AI module to determine the preferred RRC configuration parameters, information related to the preferred transmission method needs to be added on the E2 interface.

For an implementation in which the Non-RT RIC 101-1 and the Near-RT RIC 102-1 jointly execute the AI module to complete this decision, Non-RT RIC 101-1 training results and information on model deployment needs to be added on the A1 interface, and information related to the preferred RRC configuration parameters needs to be added on the E2 interface. The Non-RT RIC 101-1 training results added on the A1 interface may be the preferred RRC configuration parameters information of each user, movement speed level information of each user, or movement model information of each user.

Step 605 is the same as step 305.

To support the implementation of the above process, other auxiliary steps may be added.

For example, the network function module 102 may inform the SMO 101 through the O1 interface whether the network function module 102 or the cell supports the preferred transmission method-based sub-slice function. The flow in FIG. 6 is only performed for the network function module 102 or cell supporting this function.

For example, the network function module 102 may further report some measurement data to help the RIC evaluate effects of the preferred transmission method policy, so as to help the RIC optimize an algorithm or terminate the preferred transmission method-based sub-slice function.

According to the above embodiments, by measuring user traffic volume, traffic type, and mobility, etc., different transmission methods are selected for users in different scenarios, and the selected transmission methods are implemented by the slice policy, RRC configuration, or a MAC scheduling policy, so as to achieve the improvement of performance in aspects of improving the throughput of the base station system, improving the user experience, and helping the terminal save power, etc.

Embodiment B-1

Figure 7:
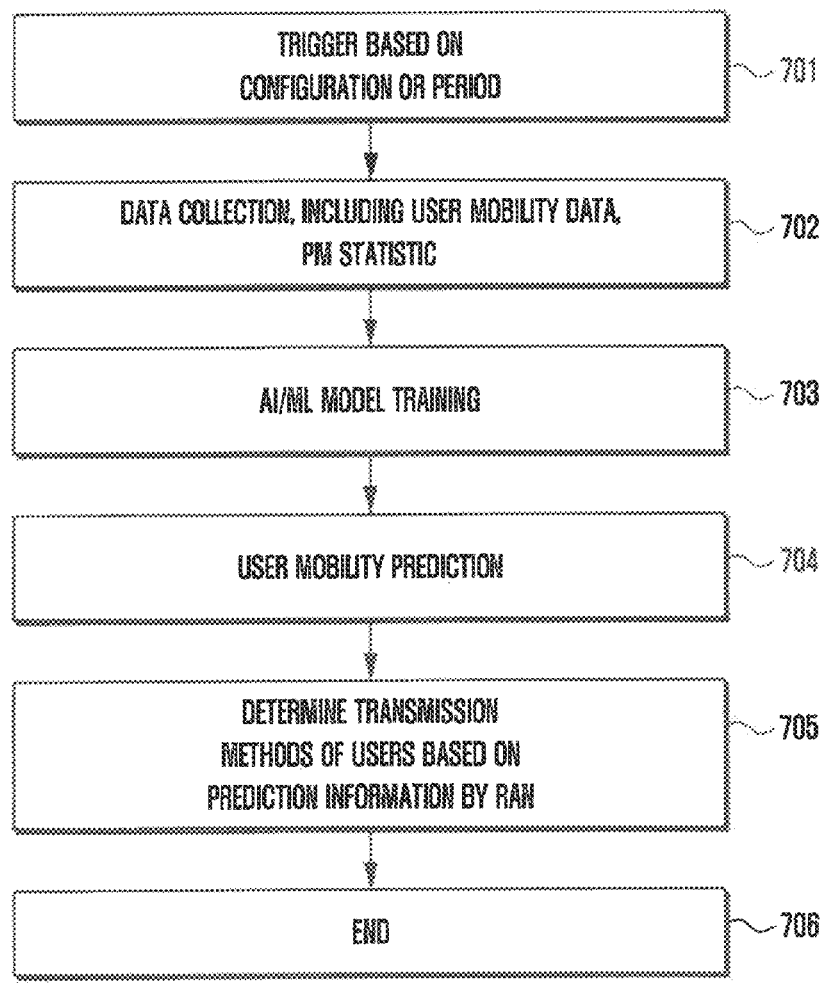
FIG. 7 illustrates prediction-based system performance optimization in a mobility scenario of a user according to an embodiment of the present disclosure.

FIG. 7 illustrates prediction-based system performance optimization in a mobility scenario of a user according to an embodiment of the present disclosure. The description will be made below with reference to FIG. 7.

In step 701, the prediction-based system performance optimization method is triggered. Compared with the standard methods, in some embodiments of the present disclosure, the prediction-based system performance optimization method is not triggered by events, but is executed periodically based on a configuration. In other embodiments of the present disclosure, the prediction-based system performance optimization method may be triggered based on a configuration or may periodically execute. For example, functions are turned on according to needs of service providers or customers. Or in one embodiment of the O-RAN system, the functions are always turned on.

In step 702, data is collected. Compared with the standard methods, embodiments of the present disclosure include not only internal data of a RAN collected by the SMO 101 using an O1 interface, but also rich data provided from outside of the RAN (e.g., from external systems 105).

The collected data mainly includes the user's movement speed, movement direction, orientation, acceleration, etc., which is directly provided by GPS or obtained by calculation. If navigation information of users and sensor information of vehicles can be obtained, richer data can be obtained.

Data is collected and then summarized in an RIC module for AI processing.

In a case in which the RIC module is a Non-RT RIC 101-1, the SMO 101 transfers information collected by the SMO 101 to the Non-RT RIC module 101-1 through an internal bus, and Near-RT RIC 102-1 transfers its collected information to the Non-RT RIC module 101-1 through an A1 interface.

In a case in which the RIC module is a Near-RT RIC 102-1, the SMO 101 transfers information collected by the SMO 101 to the Non-RT RIC module 101-1 through an internal bus, so that the same is further transferred to the Near-RT RIC module 102-1 by the Non-RT RIC 101-1 through the A1 interface, and the network function 102 transfers the information to the Near-RT RIC module 102-1 through an E2 interface.

In step 703, the RIC performs AI/ML model training.

The AI model may be deployed to the Non-RT RIC 101-1 or/and the Near-RT RIC 102-1. The difference between the Non-RT RIC 101-1 and the Near-RT RIC 102-1 is mainly speed of operation. The Non-RT RIC 101-1 operates at the seconds level, and the Near-RT RIC 102-1 operates at the level of 10 ms~1 s. No matter where the AI model is deployed, it is within the protection scope of this patent.

The AI model training may be triggered periodically or by events, for example, when internal performance measurement data of the RAN is lower than a certain indicator, or when the number of users in a cell increases or decreases.

In step 704, the AI/ML model is used for prediction.

The AI model may be deployed to the Non-RT RIC 101-1 or/and the Near-RT RIC 102-1. The difference between the Non-RT RIC 101-1 and the Near-RT RIC 102-1 is mainly speed of operation. The Non-RT RIC 101-1 operates at the seconds level, and the Near-RT RIC 102-1 operates at the level of 10 ms~1 s. No matter where the AI model is deployed, it falls within the protection scope of this patent.

The following description will take the Near-RT RIC 102-1 as an example, and the processing related to the Non-RT RIC 101-1 is similar and will not be described separately.

The SMO 101 periodically transmits data to the Near-RT RIC 102-1 through the A1 interface, and the Near-RT RIC 102-1 uses the AI model for near-real-time prediction. For the following reasons, it is necessary to predict for a next period instead of transmitting external data directly to a RAN node.

First, for real-time reasons, both the Near-RT RIC 102-1 (10 ms~1 s) and the Non-RT RIC 101-1 (>1 s) may not guarantee absolute real-time results. If data is transmitted directly to the RAN node, errors will occur due to time lag.

Second, information that may not be reflected by direct data may be obtained through the AI/ML prediction. For example, user acceleration, position at a next moment, etc., or whether the traffic type belongs to a video or a call, may be inferred from the user's current traffic application layer information.

Third, data may be processed into a format required by the RAN node, thus reducing the processing complexity of the RAN.

In step 705, functional modules in the RAN node use prediction information to assist in decision-making, using the prediction information to make a decision on a user transmission method.

In some embodiments, the RAN node receives mobility prediction information through the E2 interface.

The mobility prediction information may include detailed movement speed related information of users, such as current movement speed, movement direction, acceleration, acceleration direction, and how long the movement speed will last.

The mobility prediction information may also include general information related to the user's movement speed, such as a mobility level of a user, which may be, for example, static, moving slowly, moving at medium speed, or moving at high speed.

The mobility prediction information may also include relevant information on a general interval of user movement speed, for example, the user movement speed is below 1 km/h, or ranges from 1 km/h to 3 km/h, etc.

Compared with the standard methods, the present disclosure introduces user-level mobility related information on the E2 interface.

After receiving the user mobility related information, the RAN node will determine a preferred transmission method of the user based on the above information.

For example, for low-speed users, MU-MIMO transmission is preferred. For high-speed users, SU-MIMO transmission is preferred.

To support the implementation of the above process, other auxiliary steps may be added.

For example, the network function module 102 may inform the SMO 101 through the O1 interface whether the network function module 102 or the cell supports the function based on receiving user mobility information. The flow in FIG. 7 is only performed for the network function module 102 or cell supporting this function.

For example, the network function module 102 may further report some measurement data to help the RIC evaluate effects of the preferred transmission method policy, thus helping the RIC optimize an algorithm or terminate the function.

According to the above embodiments, by prediction of mobility, different transmission methods are selected for users in different scenarios, and the selected transmission methods are implemented by the slice policy, RRC configuration, or MAC scheduling policy, so as to achieve the improvement of performance in aspects of improving the throughput of the base station system, improving the user experience, and helping the terminal save power, etc.

Embodiment B-2

Figure 8:
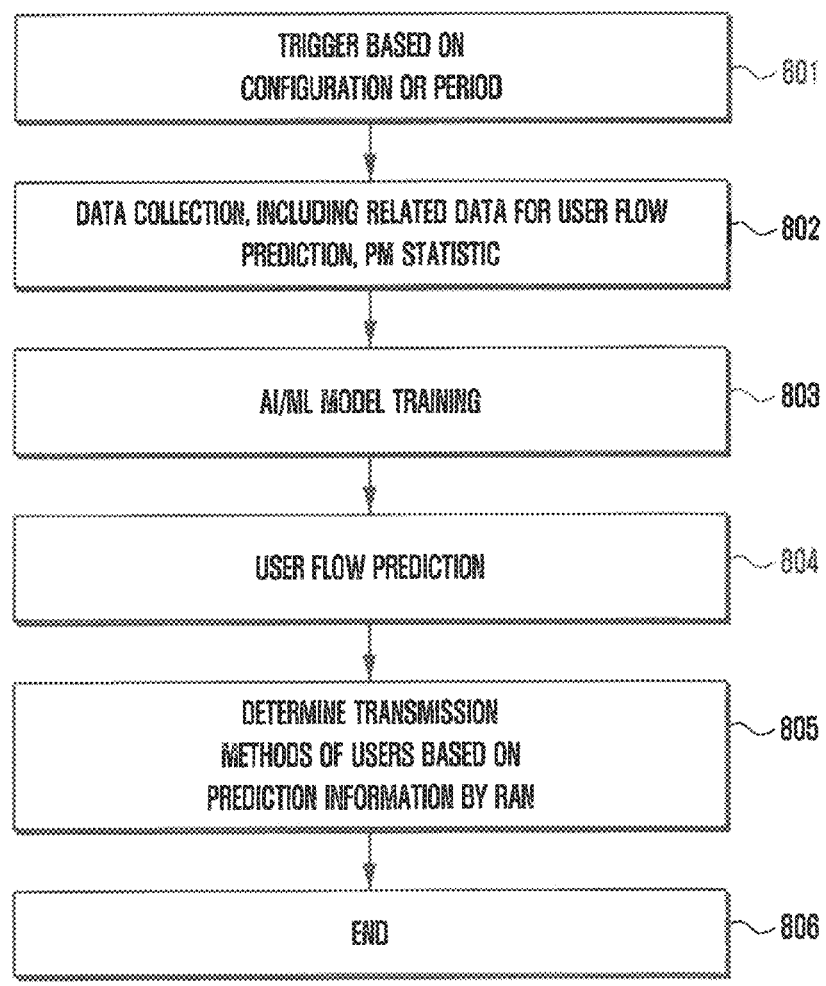
FIG. 8 illustrates prediction-based system performance optimization in a traffic scenario according to an embodiment of the present disclosure.

FIG. 8 illustrates prediction-based system performance optimization in a traffic scenario according to an embodiment of the present disclosure. The description will be made below with reference to FIG. 8.

In step 801, the prediction-based system performance optimization method is triggered. Compared with the standard methods, in some embodiments of the present disclosure, the prediction-based system performance optimization method is not triggered by events, but is executed periodically based on a configuration. In other embodiments of the present disclosure, the prediction-based system performance optimization method may be triggered based on a configuration or may periodically execute. For example, functions are turned on according to needs of service providers or customers. Or in one embodiment of the O-RAN system, the functions are always turned on.

In step 802, data is collected. Compared with the standard methods, embodiments of the disclosure include not only internal data of a RAN collected by the SMO 101 using an O1 interface, but also rich data provided from outside of the RAN (e.g., from external systems 105).

The collected data mainly includes traffic type and flow information of the user, for example, whether the user is engaged in a voice call, file transmission or video viewing, etc., and information such as transmission file size and video duration.

Data is collected and then summarized in an RIC module for AI processing.

In a case in which the RIC module is a Non-RT RIC 101-1, the SMO 101 transfers information collected by the SMO 101 to the Non-RT RIC module 101-1 through an internal bus, and Near-RT RIC 102-1 transfers the information collected by the Near-RT RIC 102-1 to the Non-RT RIC module 101-1 through an A1 interface.

In a case in which the RIC module is a Near-RT RIC 102-1, the SMO 101 transfers information collected by the SMO 101 to the Non-RT RIC module 101-1 through an internal bus, so that the same is further transferred to the Near-RT RIC module 102-1 by the Non-RT RIC 101-1 through the A1 interface, and the network function 102 transfers the information to the Near-RT RIC module 102-1 through an E2 interface.

In step 803, the RIC performs AI/ML model training.

The AI model may be deployed to the Non-RT RIC 101-1 or/and the Near-RT RIC 102-1. The difference between the Non-RT RIC 101-1 and the Near-RT RIC 102-1 is mainly speed of operation. The Non-RT RIC 101-1 operates at the seconds level, and the Near-RT RIC 102-1 operates at the level of 10 ms~1 s. No matter where the AI model is deployed, it falls within the protection scope of this patent.

The AI model training may be triggered periodically or by events, for example, when internal performance measurement data of the RAN is lower than a certain indicator, or when a number of users in a cell increases or decreases.

In step 804, the AI/ML model is used for prediction.

The AI model may be deployed to the Non-RT RIC 101-1 or/and the Near-RT RIC 102-1. The difference between the Non-RT RIC 101-1 and the Near-RT RIC 102-1 is mainly speed of operation. The Non-RT RIC 101-1 operates at the seconds level, and the Near-RT RIC 102-1 operates at the level of 10 ms~1 s. No matter where the AI model is deployed, it falls within the protection scope of this patent.

The following description will take the Near-RT RIC 102-1 as an example, and the processing related to the Non-RT RIC 101-1 is similar and will not be described separately.

The SMO 101 periodically transmits data to the Near-RT RIC 102-1 through the A1 interface, and the Near-RT RIC 102-1 uses the AI model for near-real-time prediction. For the following reasons, it is necessary to predict for a next period instead of transmitting external data directly to a RAN node.

First, for real-time reasons, both the Near-RT RIC 102-1 (10 ms~1 s) and the Non-RT RIC 101-1 (>1 s) may not guarantee absolute real-time results. If data is transmitted directly to the RAN node, errors will occur due to time lag.

Second, information that may not be reflected by direct data may be obtained through the AI/ML prediction. For example, user acceleration, position at a next moment, etc., or whether the traffic type belongs to a video or a call, may be inferred from the user's current traffic application layer information.

Third, data may be processed into a format required by the RAN node, thus reducing the processing complexity of the RAN.

In step 805, functional modules in the RAN node use prediction information to assist in decision-making, using the prediction information to make a decision on a user transmission method.

In some embodiments, the RAN node receives flow prediction information through the E2 interface.

The flow prediction information may include current buffer occupation (BO), traffic model, a traffic arrival interval, traffic average BO, traffic BO variance of a user, etc.

The flow prediction information may also include general user flow related information, such as the user's flow level, which may be, for example, small flow traffic, medium flow traffic, or high flow traffic, etc.

The flow prediction information may also include relevant information on a general flow interval, for example, the flow speed of the user is 10 bytes per millisecond, or ranges from 10 bytes per millisecond to 300 bytes per millisecond.

Compared with the standard methods, the present disclosure introduces user-level flow related information on the E2 interface.

After receiving the user flow related information, the RAN node will determine a preferred transmission method of the user based on the above information.

For example, for low-flow users, SU-MIMO transmission is preferred. For high-flow users, MU-MIMO transmission is preferred.

To support the implementation of the above process, other auxiliary steps may be added.

For example the network function module 102 may inform the SMO 101 through the O1 interface whether the network function module 102 or the cell supports the function based on receiving user flow information. The flow in FIG. 8 is only performed for the network function module 102 or cell supporting this function.

For example, the network function module 102 may further report some measurement data to help the RIC evaluate effects of the preferred transmission method policy, thus helping the RIC optimize an algorithm or terminate the function.

According to the above embodiments, by predicting traffic volume and traffic type of users, different transmission methods are selected for users in different scenarios, and the selected transmission methods are implemented by the slice policy, RRC configuration, or MAC scheduling policy, so as to achieve the improvement of performance in aspects of improving the throughput of the base station system, improving the user experience, and helping the terminal save power, etc.

Embodiment B-3

Figure 9:
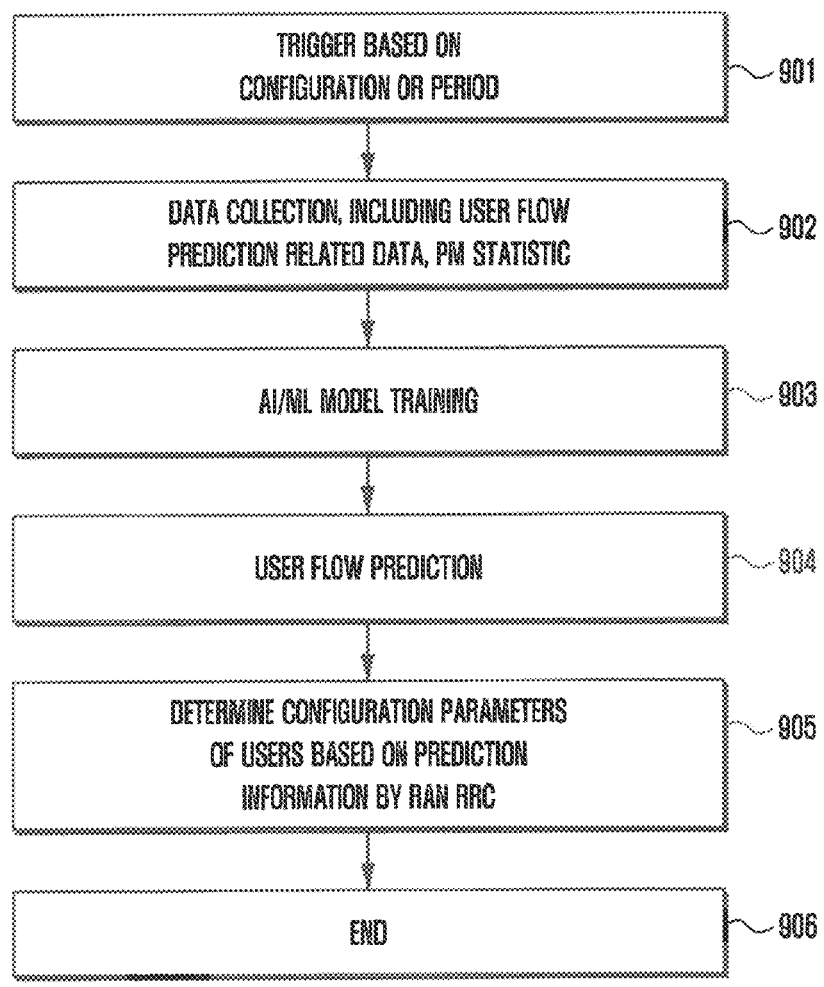
FIG. 9 illustrates prediction-based configuration parameters optimization according to an embodiment of the present disclosure.

FIG. 9 illustrates prediction-based configuration parameters optimization according to an embodiment of the present disclosure. The description will be made below with reference to FIG. 9.

In step 901, the prediction-based configuration parameters optimization method is triggered. Compared with the standard methods, in some embodiments of the present disclosure, the prediction-based configuration parameters optimization method is not triggered by events, but is executed periodically based on a configuration. In other embodiments of the present disclosure, the prediction-based configuration parameters optimization method may be triggered based on a configuration or may periodically execute. For example, functions are turned on according to needs of service providers or customers. Or in one embodiment of the O-RAN system, the functions are always turned on.

In step 902, data is collected. Compared with the standard methods, the present disclosure includes not only internal data of a RAN collected by the SMO 101 using an O1 interface, but also rich data provided from outside of the RAN (e.g., from external systems 105).

The collected data mainly includes a type of and flow information of the user's current traffic, for example, whether the user is engaged in a voice call, file transmission or video viewing, etc., and information such as transmission file size and video duration.

Data is collected and then summarized in an RIC module for AI processing.

In a case in which the RIC module is a Non-RT RIC 101-1, the SMO 101 transfers information collected by the SMO 101 to the Non-RT RIC module 101-1 through an internal bus, and Near-RT RIC 102-1 transfers the information collected by the Near-RT RIC 102-1 to the Non-RT RIC module 101-1 through an A1 interface.

In a case in which the RIC module is a Near-RT RIC 102-1, the SMO 101 transfers information collected by the SMO 101 to the Non-RT RIC module 101-1 through an internal bus, so that the same is further transferred to the Near-RT RIC module 102-1 by the Non-RT RIC 101-1 through the A1 interface, and the network function 102 transfers the information to the Near-RT RIC module 102-1 through an E2 interface.

In step 903, the RIC performs AI/ML model training.

The AI model may be deployed to the Non-RT MC 101-1 or/and the Near-RT RIC 102-1. The difference between the Non-RT MC 101-1 and the Near-RT RIC 102-1 is mainly speed of operation. The Non-RT MC 101-1 operates at the seconds level, and the Near-RT RIC 102-1 operates at the level of 10 ms~1 s. No matter where the AI model is deployed, it falls within the protection scope of this patent.

The AI model training may be triggered periodically or by events, for example, when internal performance measurement data of the RAN is lower than a certain indicator, or when the number of users in a cell increases or decreases.

In step 904, the AI/ML model is used for prediction.

The AI model may be deployed to the Non-RT RIC 101-1 or/and the Near-RT RIC 102-1. The difference between the Non-RT RIC 101-1 and the Near-RT RIC 102-1 is mainly speed of operation. The Non-RT RIC 101-1 operates at the seconds level, and the Near-RT RIC 102-1 operates at the level of 10 ms~1 s. No matter where the AI model is deployed, it falls within the protection scope of this patent.

The following description will take the Near-RT RIC 102-1 as an example, and the processing related to the Non-RT RIC 101-1 is similar and will not be described separately.

The SMO 101 periodically transmits data to the Near-RT RIC 102-1 through the A1 interface, and the Near-RT RIC 102-1 uses the AI model for near-real-time prediction. For the following reasons, it is necessary to predict for a next period instead of transmitting external data directly to a RAN node.

First, for real-time reasons, both the Near-RT RIC 102-1 (10 ms~1 s) and the Non-RT RIC 101-1 (>1 s) may not guarantee absolute real-time results. If data is transmitted directly to the RAN node, errors will occur due to time lag.

Second, information that may not be reflected by direct data may be obtained through the AI/ML prediction. For example, user acceleration, position at a next moment, etc., or whether the traffic type belongs to a video or a call, may be inferred from the user's current traffic application layer information.

Third, data may be processed into a format required by the RAN node, thus reducing the processing complexity of the RAN.

In step 905, the functional modules in the RAN node use the prediction information to assist in decision-making, using the prediction information to make a decision on a user RRC configuration.

In some embodiments, the RAN node receives flow prediction information through the E2 interface.

The flow prediction information may include current buffer occupation (BO), traffic model, a traffic arrival interval, traffic average BO, traffic BO variance of a user, etc.

The flow prediction information may also include general user flow related information, such as the user's flow level, which may be, for example, small flow traffic, medium flow traffic, or high flow traffic, etc.

The flow prediction information may also include relevant information on a general flow interval, for example, the flow speed of the user is 10 bytes per millisecond, or ranges from 10 bytes per millisecond to 300 bytes per millisecond.

Compared with the standard methods, the present disclosure introduces user-level flow related information on the E2 interface.

After receiving the user traffic related information, the RAN nodes will determine RRC configuration parameters of the user based on the above information.

For example, for low-flow users, long DRX cycle parameters and long SRS cycle configuration is preferred. For high-flow users, short DRX cycle parameters and short SRS cycle configuration is preferred.

To support the implementation of the above process, other auxiliary steps may be added.

For example, the network function module 102 may inform the SMO 101 through the O1 interface whether the network function module 102 or the cell supports the function based on receiving user flow information. The flow in FIG. 9 is only performed for the network function module 102 or cell supporting this function.

For example, the network function module 102 may further report some measurement data to help the RIC evaluate effects of the preferred transmission method policy, thus helping the RIC optimize an algorithm or terminate the function.

According to the above embodiments, by predicting traffic volume, traffic type, and mobility of users, different transmission methods are selected for users in different scenarios, and the selected transmission methods are implemented by the slice policy, RRC configuration, or MAC scheduling policy, so as to achieve the improvement of performance in aspects of improving the throughput of the base station system, improving the user experience, and helping the terminal save power, etc.

In order to realize the system performance optimization according to the embodiments of the present disclosure described above, the following messages need to be introduced (some specific interface information is listed as an example).

An A1 interface, in the downlink direction. If the Non-RT RIC 101-1 does not execute the AI/ML model, it is necessary to provide the following data on this interface, including: user GPS information, navigation route, sensor information (vehicles or other mobile devices), and user traffic software application layer information, such as traffic type, video size and duration, file size, etc. If the Non-RT RIC 101-1 executes the AI/ML model for prediction, it is necessary to provide the following prediction data: for Embodiment B-1, mobility data, speed at all time points of each user in the next period or cycle (for example, using 1 s as a cycle, e.g., dividing time points by 1 ms), movement direction, acceleration, orientation, altitude and other possible information. For Embodiment B-2, traffic model data, including traffic type, transmission rate, and duration.

An E2 interface, in the downlink direction. If the Near-RT RIC 102-1 executes the AI/ML model, it is necessary to provide the following data on this interface: for Embodiment B-1, mobility data, speed at all time points of each user in the next period or cycle (for example, using 100 ms as a cycle, e.g., dividing time points by 100 ms), movement direction, acceleration, orientation, altitude and other possible information. For Embodiment B-2, traffic model data, including traffic type, transmission rate, and duration.

An E2 interface, in the uplink direction. Capability descriptions of RAN functional modules are provided on this interface, including a MAC scheduling module describing its ability to handle user mobility information, and an RRC module describing its ability to handle user traffic model information.

An O1 interface, in the uplink direction. Reporting of related measurement data, such as total system throughput, average throughput of a user, MIMO transmission method of a user, average layer number, etc., needs to be supported on this interface.

Further, in order to support the embodiments of the present disclosure, the following modifications need to be made for the interfaces:

1. Adding a sub-slice instance information structure, which is defined in the following Table 1.

TABLE 1

| Information Element/ Group Name | Does it exist? | Range | Information Element Type and Reference | Semantic Description |
|---|---|---|---|---|
| >network sub-slice instance identification information | Optional | | | network sub-slice instance identification |
| >>transmission method | Mandatory | | Enumerate SSS types (SRS-based MU-MIMO, PMI-based MU-MIMO, SU-MIMO . . . ) | supported transmission methods |
| >>network sub-slice instance identification | Mandatory | | Integer (1 . . . 65535) | identification |

The structure at least includes transmission method and sub-slice instance identification. This structure is used both in measurement reporting and decision message sending. The interfaces involved are E2 and A1.

2. Adding user's capability information about Massive MIMO, which is defined in the following Table 2.

TABLE 2

| Information Element/ Group Name | Does it exist? | Range | Information Element and Reference | Semantic Description |
|---|---|---|---|---|
| >user capability | Optional | | | capability information of a user |
| >>supporting SRS transmit port switching | Mandatory | | 38.331 Section 6.3.3 | number of SRS ports |
| >>supporting downlink DMRS types | Mandatory | | 38.331 Section 6.3.3 | DMRS type |
| >>2 front-load DMRS | Mandatory | | 38.331 Section 6.3.3 | DMRS symbol type |
| >>DRX information | Mandatory | | 38.331 Section 6.3.3 | DRX information |
| >>CSI-RS information | Mandatory | | 38.331 Section 6.3.3 | CSI-RS information |
| >>codebook configuration information | Mandatory | | 38.331 Section 6.3.3 | codebook configuration |

3. Mobility data definition (A1, E2 interface downlink), which is defined in the following Table 3.

TABLE 3

| Information Element/ Group Name | Does it exist? | Range | Information Element and Reference | Semantic Description |
|---|---|---|---|---|
| moving information | Optional | | | moving information |
| >>VelocityList | Mandatory | 1 . . . <MaxNumOfVelocityList> | Integer | Moving speed |
| >>DirectionList | Mandatory | 1 . . . <MaxNumOfDirectionList> | String | moving orientation information relative to a base station |

TABLE 3-continued

| Information Element/ Group Name | Does it exist? | Range | Information Element and Reference | Semantic Description |
|---|---|---|---|---|
| >>DistanceList | Optional | 1 ... <MaxNumOfDistanceList> | Integer | distance from a cell RRU |

4. Traffic model data definition (A1, E2 interface downlink), which is defined in the following Table 4.

TABLE 4

| Information Element/ Group Name | Does it exist? | Range | Information Element and Reference | Semantic Description |
|---|---|---|---|---|
| >buffer information | Optional | | | buffer information |
| >>BufferValueList | Mandatory | 1 ... MaxNumOfBufferValueList> | | size of traffic volume |

Specific embodiments according to the present disclosure have been described above with reference to FIGS. 3 to 9. The general flow of the embodiments for class A (i.e., when the RIC directly participates in decision-making and the decision is realized by slices) and class B (i.e., when the RIC makes predictions and assists functional modules in RAN nodes in optimization processing) will be described below with reference to FIGS. 10 and 11.

Figure 10:
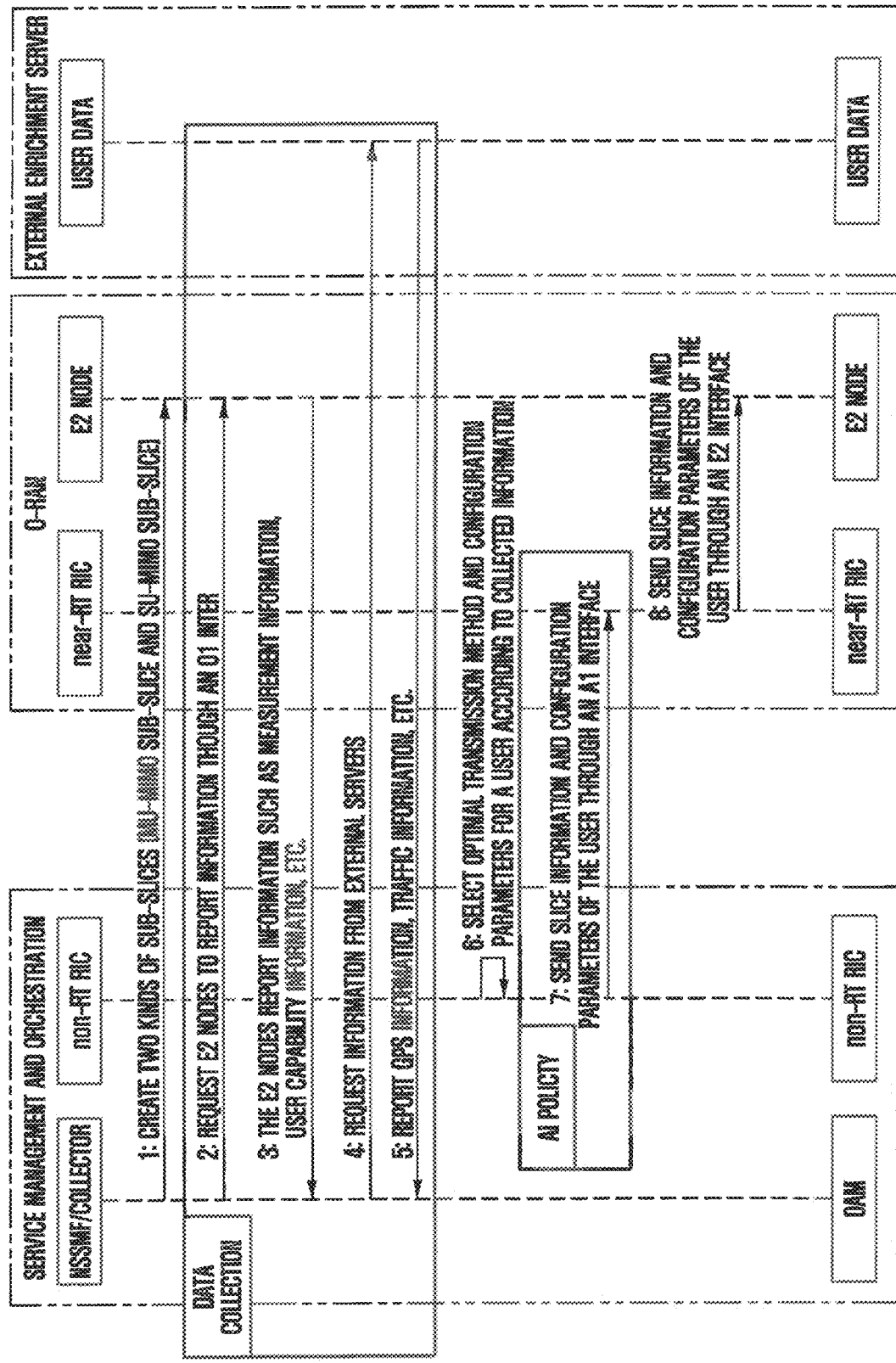
FIG. 10 illustrates a general flowchart of an implementation of slice-based performance optimization in which a RAN intelligent controller makes decisions according to an embodiment of the present disclosure.

FIG. 10 shows a general flowchart of an implementation of slice-based performance optimization in which a RAN intelligent controller (RIC) makes decisions according to an embodiment of the present disclosure. The description will be made below with reference to FIG. 10.

Generally, the operation flow of embodiments for class A includes the following steps.

In step 1: create a sub-slice supporting a MU transmission method and a sub-slice supporting a SU transmission method, which corresponds to step 302 (using Embodiment A-1 as an example). Users with different transmission methods are separated by radio resources based on sub-slices. It is beneficial to improve spectrum efficiency and optimize management of the sub-slices later.

In step 2: the SMO 101 requests E2 Nodes (e.g., in a network function 102) to report the required data information.

In step 3: the E2 Nodes report the information to the SMO 101, which corresponds to step 303. In an embodiment of the present disclosure, the Non-RT RIC 101-1 needs to decide which type of transmission method the user should use based on the capability information of the user and the like provided by the E2 Nodes.

In step 4 and step 5: the SMO 101 obtains GPS information and traffic information from an external server (e.g., external server 105), which corresponds to step 303. In this scheme, an AI/ML module of the Non-RT RIC 101-1 obtains a user's movement model based on the GPS information, and provides information such as speed, movement direction, spatial coordinates, surrounding buildings, and the like for Non-RT RIC 101-1 decision-making. The AI/ML module of the Non-RT RIC 101-1 obtains the user's traffic model based on the traffic information, and provides information such as traffic type, traffic data volume, traffic QoS requirement, and the like for Non-RT RIC 101-1 decision-making.

In step 6: the Non-RT RIC 101-1 allocates an optimal transmission method to the user based on the movement information, traffic information, user capability information, etc., which corresponds to step 304. In embodiments of the disclosure, the user dynamically adjusts its transmission method according to changes in scenarios, thereby reducing unnecessary retransmission and improving throughput of the system and resource utilization.

In step 7 and step 8: issue the decision result of the Non-RT RIC 101-1 to the E2 Nodes (O-DU, e.g., O-DU 102-3, and O-CU-CP, e.g., O-CU 102-2), which corresponds to step 305. The O-DU is responsible for scheduling and radio resource management. The O-CU-CP is responsible for configuration parameters management.

The SMO 101 obtains the GPS (Global Positioning System) information and the traffic information from an external application software or an application server (e.g., an external system 105), and obtains the user capability information, slice-related measurement information and user performance measurement information from the E2 Nodes. The AI/ML module in the Non-RT RIC 101-1 obtains a mobile model and a traffic model based on the above information. The AI/ML module in the Non-RT RIC 101-1 selects the optimal transmission method (such as SU-MIMO or MU-MIMO) and the optimal configuration parameters (such as DRX (Discontinuous Reception), SR(Scheduling Request), PDSCH (Physical Downlink Shared Channel), etc.) for users based on the movement model, the traffic model, the slice-related measurement information, the user performance measurement information, and the user capability information, etc. The Non-RT RIC 101-1 transmits the configuration parameters to the O-CU-CP, and informs the O-DU of the information on the slice to which the user belongs. The O-CU-CP configures the configuration parameters to the UE through signaling messages, and updates the configuration parameters of the user on the O-DU side at the same time. According to the received slice configuration notification, the O-DU establishes bearer information of the user in the slice to which it belongs. After the configuration is completed, traffic is provided for users in this slice.

Figure 11:
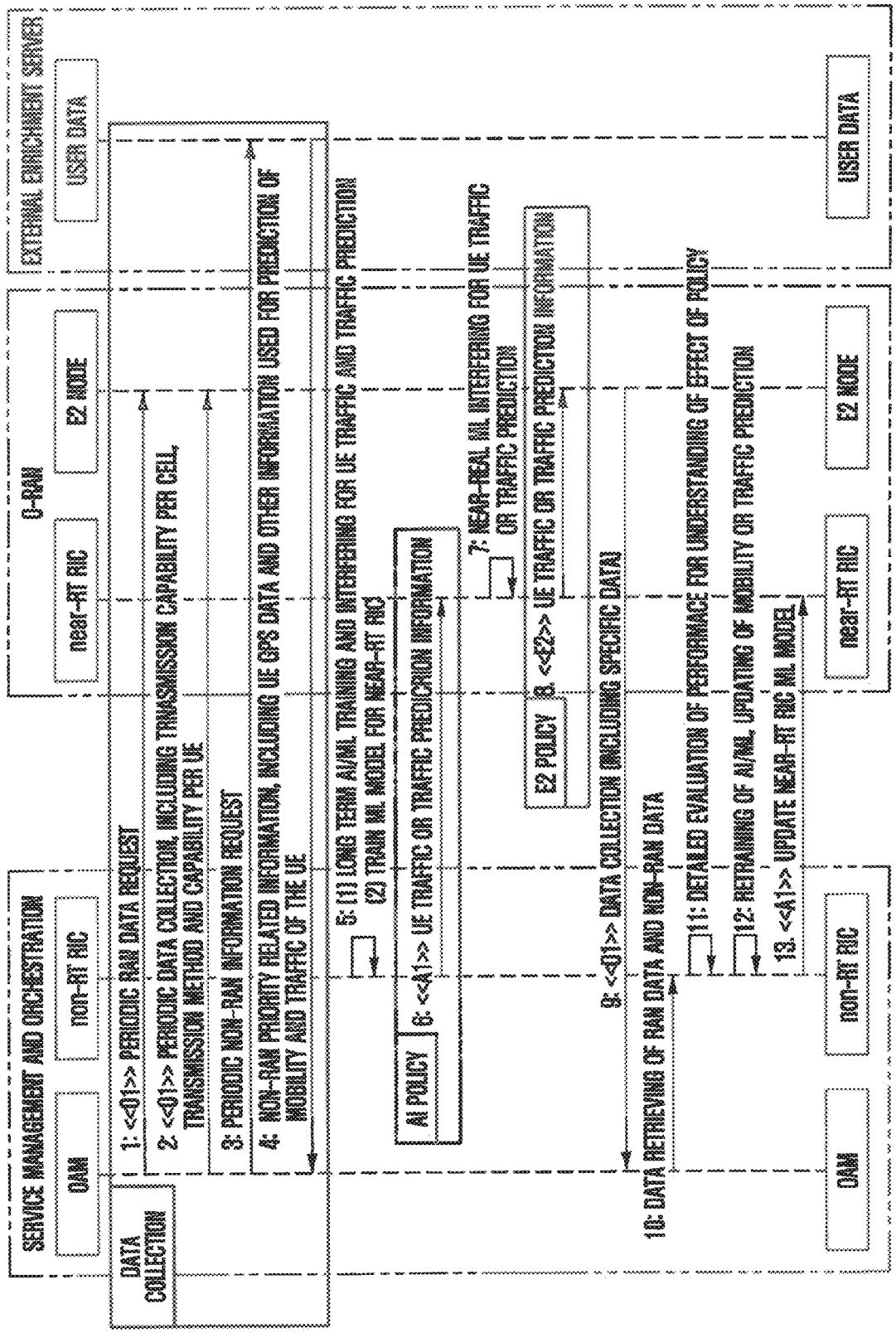
FIG. 11 illustrates a general flowchart of an implementation method of performance optimization in which a RAN intelligent controller makes predictions and assists RAN nodes, according to an embodiment of the present disclosure.

FIG. 11 shows a general flowchart of an implementation of performance optimization of RAN nodes in which a RAN intelligent controller (MC) makes predictions and assists RAN nodes, according to an embodiment of the present disclosure. The description will be made below with reference to FIG. 11.

Generally, the operation flow of embodiments for class B includes the following steps.

In step 1: periodically request an O1 interface to report internal measurement data of a RAN.

In step 2: the O1 interface reports the internal measurement data of the RAN, which corresponds to step 702 (using Embodiment B-1 as an example).

In step 3: periodically request to obtain rich data from the outside of the RAN.

In step 4: collect rich data from outside of the RAN, which corresponds to step 702. The rich data includes, for example, mobility related data such as GPS information and the like, and traffic model related data such as transmission rate and the like.

In step 5: a non-real-time intelligent controller (e.g., Non-RT RIC 101-1) performs AI/ML model training, which is a necessary step, and which corresponds to step 703. The non-real-time intelligent controller performs ML derivation and predicts mobility and traffic models, which is an optional step, and which corresponds to step 704.

In step 6: transmit prediction information to a near-real-time intelligent controller (e.g., Near-RT RIC 102-1).

In step 7: the near-real-time intelligent controller performs ML derivation and predicts the mobility and the traffic models, which is an optional step (performed when the non-real-time intelligent controller does not perform this function in step 5), and which corresponds to step 704.

In step 8: the near-real-time intelligent controller transmits prediction results to functional modules in the RAN node, which is a mandatory step, and which corresponds to step 705.

In step 9: the O1 interface feeds back performance measurement after RAN parameter adjustment or MAC scheduling policy adjustment.

In step 10: the near-real-time intelligent controller obtains RAN performance measurement information and updated information of the outside of the RAN.

In step 11: the non-real-time intelligent controller measures the influence of the prediction information on the system according to the performance feedback, and then judges whether the ML model is reasonable.

In step 12: if the non-real-time intelligent controller thinks that the ML model is unreasonable, it needs to trigger retraining, which is an optional step.

In step 13: update the ML model.

Certain examples of the present disclosure may be provided in the form of a network function entity (e.g., RIC) and/or a method performed thereby. Certain examples of the present disclosure may be provided in the form of a base station (e.g., gNB) and/or a method performed thereby. Certain examples of the present disclosure may be provided in the form of a mobile device (e.g. UE or terminal) and/or a method performed thereby. Certain examples of the present disclosure may be provided in the form of a system comprising one or more NF entities, one or more base stations and one or more mobile devices, and/or a method performed thereby.

Figure 12:
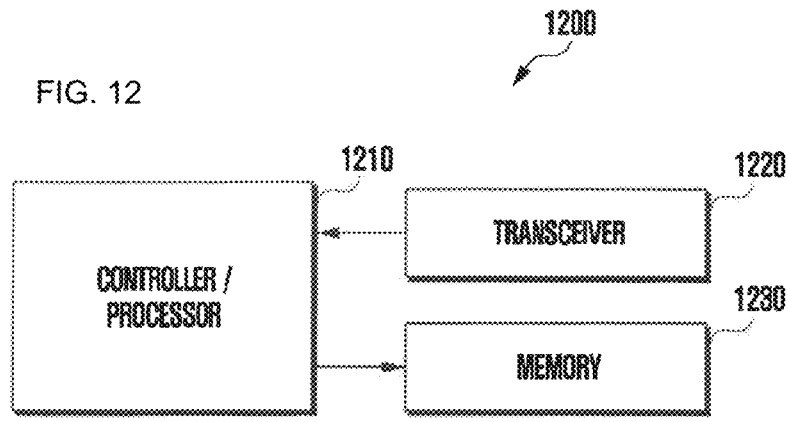
FIG. 12 illustrates a user equipment (UE) according to embodiments of the present disclosure.

FIG. 12 illustrates a user equipment (UE) according to embodiments of the present disclosure.

Referring to the FIG. 12, the UE 1200 may include a controller/processor 1210, a transceiver 1220 and a memory 1230. However, all of the illustrated components are not essential. The UE 1200 may be implemented using more or fewer components than those illustrated in FIG. 12. In addition, the controller/processor 1210 and the transceiver 1220 and the memory 1230 may be implemented as a single chip according to another embodiment.

The aforementioned components will now be described in detail.

The controller/processor 1210 may include one or more controller/processors or other processing devices that control the proposed function, process, and/or method. Operation of the UE 1200 may be implemented by the controller/processor 1210.

The transceiver 1220 may include an RF transmitter for up-converting and amplifying a transmitted signal, and an RF receiver for down-converting a frequency of a received signal. However, according to another embodiment, the transceiver 1220 may be implemented using more or fewer components.

The transceiver 1220 may be connected to the controller/processor 1210 and transmit and/or receive a signal. The signal may include control information and data. In addition, the transceiver 1220 may receive the signal through a wireless channel and output the signal to the controller/processor 1210. The transceiver 1220 may transmit a signal output from the controller/processor 1210 through the wireless channel.

The memory 1230 may store the control information or the data included in a signal obtained by the UE 1200. The memory 1230 may be connected to the controller/processor 1210 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices.

Figure 13:
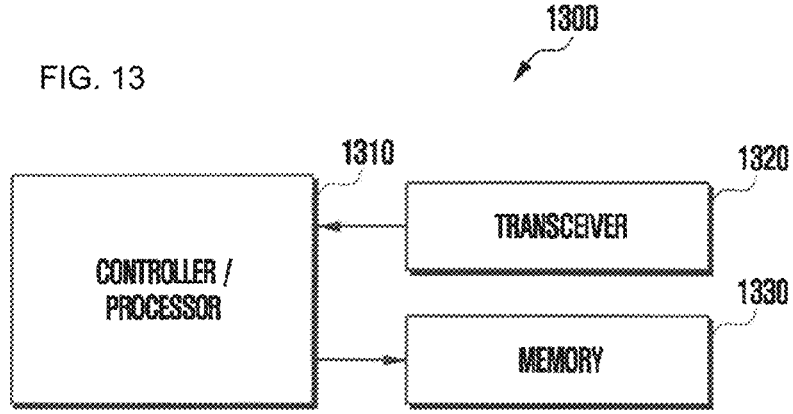
FIG. 13 illustrates a block diagram of a base station (BS) according to embodiments of the present disclosure.

FIG. 13 illustrates a block diagram of a base station (BS) according to embodiments of the present disclosure.

Referring to the FIG. 13, the BS 1300 may include a controller/processor 1310, a transceiver 1320 and a memory 1330. However, all of the illustrated components are not essential. The BS 1300 may be implemented using more or fewer components than those illustrated in FIG. 13. In addition, the controller/processor 1310 and the transceiver 1320 and the memory 1330 may be implemented as a single chip according to another embodiment.

The aforementioned components will now be described in detail.

The controller/processor 1310 may include one or more controller/processors or other processing devices that control the proposed function, process, and/or method. Operation of the BS 1300 may be implemented by the controller/processor 1310.

The transceiver 1320 may include an RF transmitter for up-converting and amplifying a transmitted signal, and an RF receiver for down-converting a frequency of a received signal. However, according to another embodiment, the transceiver 1320 may be implemented using more or fewer components.

The transceiver 1320 may be connected to the controller/processor 1310 and transmit and/or receive a signal. The signal may include control information and data. In addition, the transceiver 1320 may receive the signal through a wireless channel and output the signal to the controller/processor 1310. The transceiver 1320 may transmit a signal output from the controller/processor 1310 through the wireless channel.

The memory 1330 may store the control information or the data included in a signal obtained by the BS 1300. The memory 1330 may be connected to the controller/processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices.

Figure 14:
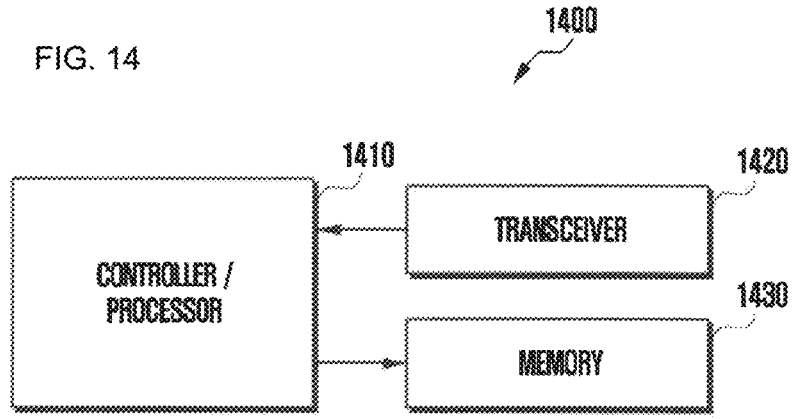
FIG. 14 illustrates a block diagram of a network function (NF) entity according to embodiments of the present disclosure.

FIG. 14 illustrates a block diagram of a network function (NF) entity according to embodiments of the present disclosure.

Referring to the FIG. 14, the NF entity 1400 may include a controller/processor 1410, a transceiver 1420 and a memory 1430. However, all of the illustrated components are not essential. The NF entity 1400 may be implemented using more or fewer components than those illustrated in FIG. 14. In addition, the controller/processor 1410 and the transceiver 1420 and the memory 1430 may be implemented as a single chip according to another embodiment.

The aforementioned components will now be described in detail.

The controller/processor 1410 may include one or more controller/processors or other processing devices that control the proposed function, process, and/or method. Operation of the NF entity 1400 may be implemented by the controller/processor 1410.

The transceiver 1420 may include an RF transmitter for up-converting and amplifying a transmitted signal, and an RF receiver for down-converting a frequency of a received signal. However, according to another embodiment, the transceiver 1420 may be implemented using more or fewer components.

The transceiver 1420 may be connected to the controller/processor 1410 and transmit and/or receive a signal. The signal may include control information and data. In addition, the transceiver 1420 may receive the signal through a wireless channel and output the signal to the controller/processor 1410. The transceiver 1420 may transmit a signal output from the controller/processor 1410 through the wireless channel.

The memory 1430 may store the control information or the data included in a signal obtained by the NF entity 1400. The memory 1430 may be connected to the controller/processor 1410 and store at least one instruction or a protocol or a parameter for the proposed function, process, and/or method. The memory 1430 may include read-only memory (ROM) and/or random access memory (RAM) and/or hard disk and/or CD-ROM and/or DVD and/or other storage devices.

The above are only preferred embodiments of this disclosure, and are not used to limit this disclosure. Any modifications, equivalent substitutions, improvements, etc. made within the spirit and principles of this disclosure should be included in the scope of protection of this disclosure.

It will be understood by those skilled in the art that the present disclosure encompasses devices for performing one or more of the operations described in the present disclosure. These devices may be specially designed and manufactured for the desired purpose, or they may include known devices in general-purpose computers. These devices have stored computer programs that are selectively activated or reconfigured. Such computer programs may be stored in a device (e.g., computer) readable medium including, but not limited to, any type of disk (including floppy disk, hard disk, optical disk, CD-ROM, and magneto-optical disk), ROM (Read-Only Memory), RAM (Random Access Memory), EPROM (erasable programmable read-only memory), EEPROM (electrically erasable programmable read-only memory), flash memory, magnetic card or optical card, or stored in any type of medium suitable for storing electronic instructions and respectively coupled to the bus. That is, a readable medium includes any medium that stores or transmits information in a form readable by a device (e.g., a computer).

It will be understood by those skilled in the art that each block in these structural diagrams and/or block diagrams and/or flow diagrams and combinations of blocks in these structural diagrams and/or block diagrams and/or flow diagrams can be implemented by computer program instructions. It will be understood by those skilled in the art that these computer program instructions can be provided to a processor of a general-purpose computer, a professional computer or other programmable data processing method for implementation, so that the solutions specified in the block or blocks of the structural diagram and/or block diagram and/or flow diagram of the present disclosure can be executed by the processor of the computer or other programmable data processing method.

Those skilled in the art will understand that various operations, methods, steps, measures, and schemes in the flows that have been discussed in this disclosure can be alternated, changed, combined, or deleted. Further, other steps, measures, and schemes in various operations, methods, and processes already discussed in this disclosure can also be alternated, changed, rearranged, decomposed, combined, or deleted. Further, steps, measures, and schemes in various operations, methods, and processes disclosed in the present disclosure of the prior art can also be alternated, changed, rearranged, decomposed, combined, or deleted.

The above is only part of the implementation of this disclosure, and it should be pointed out that for those of ordinary skill in the technical field, without departing from the principles of this disclosure, several improvements and embellishments can be made, and these improvements and embellishments should also be regarded as included in the scope of protection of this disclosure.

What is claimed is:

1. A method performed by a radio access network (RAN) intelligent controller (RIC) entity in a wireless communication system, the method comprising:
    obtaining, from a base station, first information associated with a communication capability, the first information including at least one of configuration information, or a performance indicator;
    obtaining, from an application server, second information associated with a terminal status, the second information including global positioning system (GPS) information;
    determining, based on the first information and the second information, at least one first terminal from a plurality of terminals for a first group and at least one second terminal from the plurality of terminals for a second group; and
    transmitting, to the base station, a result of the determination,
    wherein the first group is associated with a single user multiple input multiple output (SU-MIMO) transmission and the second group is associated with a multi-user multiple input multiple output (MU-MIMO) transmission.

2. The method of claim 1, wherein the first information further includes a measurement report,
wherein the second information further includes at least one of mobility information of traffic information,
wherein an artificial intelligence/machine learning (AI/ML) module is used for the determination based on the second information,
wherein the RIC entity is a non-real-time (non-RT) RIC entity and the result of the determination is transmitted via a near-RT RIC entity, and
wherein a radio access network (RAN) is an open-RAN (O-RAN).

3. The method of claim 2, wherein the determining comprises:
estimating, using the AI/ML module, based on the second information, at least one of a mobility or a traffic usage of each of the plurality of terminals; and
allocating, based on the estimation, the at least one first terminal to a first sub-slice instance corresponding to the first group and the at least one second terminal to a second sub-slice instance corresponding to the second group.

4. The method of claim 1, further comprising:
determining a radio resource control (RRC) configuration for each of the at least one first terminal and the at least one second terminal; and
transmitting, to the base station, the determined RRC configuration.

5. A radio access network (RAN) intelligent controller (RIC) entity in a wireless communication system, the RIC entity comprising:
a transceiver configured to transmit and receive a signal; and
a controller coupled with the transceiver and configured to:
obtain, from a base station, first information associated with a communication capability, the first information including at least one of configuration information, or a performance indicator,
obtain, from an application server, second information associated with a terminal status, the second information including global positioning system (GPS) information,
determine, based on the first information and the second information, at least one first terminal from a plurality of terminals for a first group and at least one second terminal from the plurality of terminals for a second group, and
transmit, to the base station, a result of the determination,
wherein the first group is associated with a single user multiple input multiple output (SU-MIMO) transmission and the second group is associated with a multi-user multiple input multiple output (MU-MIMO) transmission.

6. The RIC entity of claim 5, wherein the first information further includes a measurement report,
wherein the second information further includes traffic information,
wherein an artificial intelligence/machine learning (AI/ML) module is used for the determination based on the second information,
wherein the RIC entity is a non-real-time (non-RT) RIC entity and the result of the determination is transmitted via a near-RT RIC entity, and
wherein a radio access network (RAN) is an open-RAN (O-RAN).

7. The RIC entity of claim 6, wherein the controller is further configured to:
estimate, using the AI/ML module, based on the second information, at least one of a mobility or a traffic usage of each of the plurality of terminals, and
allocate, based on the estimation, the at least one first terminal to a first sub-slice instance corresponding to the first group and the at least one second terminal to a second sub-slice instance corresponding to the second group.

8. The RIC entity of claim 5, wherein the controller is further configured to:
determine a radio resource control (RRC) configuration for each of the at least one first terminal and the at least one second terminal, and
transmit, to the base station, the determined RRC configuration.

9. A method performed by a base station in a wireless communication system, the method comprising:
transmitting, to a radio access network (RAN) intelligent controller (RIC) entity, first information associated with a communication capability, the first information including at least one of configuration information, or a performance indicator;
receiving, from the RIC entity, terminal grouping information that includes a first group comprising at least one first terminal from a plurality of terminals and a second group comprising at least one second terminal from the plurality of terminals; and
scheduling, based on the terminal grouping information, resources for the plurality of terminals,
wherein the terminal grouping information is generated based on the first information and based on second information associated with a terminal status, the second information obtained from an application server, the second information including global positioning system (GPS) information, and
wherein the first group is associated with a single user multiple input multiple output (SU-MIMO) transmission and the second group is associated with a multi-user multiple input multiple output (MU-MIMO) transmission.

10. The method of claim 9, wherein the first information further includes a measurement report,
wherein the second information further includes traffic information,
wherein an artificial intelligence/machine learning (AI/ML) module is used for the generation of the terminal grouping information based on the second information,
wherein the RIC entity is a non-real-time (non-RT) RIC entity and the terminal grouping information is received via a near-RT RIC entity,
wherein a radio access network (RAN) is an open-RAN (O-RAN), and
wherein the at least one first terminal is allocated to a first sub-slice instance corresponding to the first group and the at least one second terminal is allocated to a second sub-slice instance corresponding to the second group based on at least one of a mobility or a traffic usage of each of the plurality of terminals that is estimated by the AI/ML module based on the second information.

11. The method of claim 9, further comprising receiving a radio resource control (RRC) configuration for each of the at least one first terminal and the at least one second terminal from the RIC entity, wherein the RRC configuration is determined by the RIC entity based on the terminal grouping information.

12. A base station in a wireless communication system, the base station comprising:
- a transceiver configured to transmit and receive a signal; and
- a controller coupled with the transceiver and configured to:
  - transmit, to a radio access network (RAN) intelligent controller (RIC) entity, first information associated with a communication capability, the first information including at least one of configuration information, or a performance indicator,
  - receive, from the RIC entity, terminal grouping information that includes a first group comprising at least one first terminal from a plurality of terminals and a second group comprising at least one second terminal from the plurality of terminals, and
  - schedule, based on the terminal grouping information, resources for the plurality of terminals,
  - wherein the terminal grouping information is generated based on the first information and based on second information associated with a terminal status, the second information obtained from an application server, the second information including global positioning system (GPS) information, and
  - wherein the first group is associated with a single user multiple input multiple output (SU-MIMO) transmission and the second group is associated with a multi-user multiple input multiple output (MU-MIMO) transmission.

13. The base station of claim 12, wherein the first information further includes a measurement report,
- wherein the second information further includes at least one of mobility information of traffic information,
- wherein an artificial intelligence/machine learning (AI/ML) module is used for the generation of the terminal grouping information based on the second information,
- wherein the RIC entity is a non-real-time (non-RT) RIC entity and the terminal grouping information is received via a near-RT RIC entity, and
- wherein a radio access network (RAN) is an open-RAN (O-RAN).

14. The base station of claim 13, wherein the at least one first terminal is allocated to a first sub-slice instance corresponding to the first group and the at least one second terminal is allocated to a second sub-slice instance corresponding to the second group based on at least one of a mobility or a traffic usage of each of the plurality of terminals that is estimated by the AI/ML module based on the second information.

15. The base station of claim 12, wherein the controller is further configured to receive a radio resource control (RRC) configuration for each of the at least one first terminal and the at least one second terminal from the RIC entity, and
- wherein the RRC configuration is determined by the RIC entity based on the terminal grouping information.

* * * * *